US012783617B2

(12) United States Patent
Palyi et al.

(10) Patent No.: US 12,783,617 B2
(45) Date of Patent: Nov. 3, 2026

(54) MONITORING USER INTERACTION WITH CLIENT DEVICES

(71) Applicant: D4t4 Solutions Plc, Sunbury-on-Thames (GB)

(72) Inventors: Istvan Palyi, Sunbury-on-Thames (GB); Anthony Phillips, Sunbury-on-Thames (GB)

(73) Assignee: D4T4 SOLUTIONS PLC, Middlesex (GB)

( * ) Notice: Subject to any disclaimer, the term of this patent is extended or adjusted under 35 U.S.C. 154(b) by 388 days.

(21) Appl. No.: 18/550,833

(22) PCT Filed: Mar. 17, 2021

(86) PCT No.: PCT/GB2021/050665
§ 371 (c)(1),
(2) Date: Sep. 15, 2023

(87) PCT Pub. No.: WO2022/195240
PCT Pub. Date: Sep. 22, 2022

(65) Prior Publication Data

US 2024/0160707 A1 May 16, 2024

(51) Int. Cl.

| | |
|---|---|
| ***G06F 21/31*** | (2013.01) |
| ***H04L 9/40*** | (2022.01) |
| ***H04L 67/50*** | (2022.01) |

(52) U.S. Cl.
CPC ........ *G06F 21/316* (2013.01); *H04L 63/0861* (2013.01); *H04L 67/535* (2022.05)

(58) Field of Classification Search
CPC ........ G06F 21/316; G06F 21/31; G06F 21/32; G06F 11/34; H04L 67/535; H04L 63/0861; H04L 9/3231
(Continued)

(56) References Cited

U.S. PATENT DOCUMENTS

| | | | |
|---|---|---|---|
| 8,880,710 | B2 | 11/2014 | Goldspink et al. |
| 8,898,309 | B2 | 11/2014 | Goldspink et al. |

(Continued)

FOREIGN PATENT DOCUMENTS

| | | | |
|---|---|---|---|
| CN | 108574605 | A | 9/2018 |
| GB | 2356783 | B | 12/2001 |

OTHER PUBLICATIONS

"Behavioral Biometrics: Frictionless Security in the Fight Against Fraud", White Paper, OneSpan, Last Update Aug. 2019, 11 pages.

(Continued)

*Primary Examiner* — Kaylee J Huang
(74) *Attorney, Agent, or Firm* — Nixon & Vanderhye, PC

(57) ABSTRACT

Monitoring user interaction with a web enabled device (1), which is running a web client (12) for loading and displaying webpages to a user and running a client side module (13) within the web client (12). Wherein the client side module (13) in use receives from a server (4) a first configuration message, which message is arranged to configure the monitoring operation of the client side module (13) so as to cause monitoring of user interaction according to a first specification and the client side module (13) is configured using the first configuration message and sends to the server (4) information obtained by the monitoring operation of the client side module in accordance with the first specification and the client side module (13) in use receives from the server (4) a second configuration message, which message is arranged to configure the monitoring operation of the client side module (13) so as to cause monitoring of user interaction according to a second specification and the client side module (13) is configured using the second configuration message and sends to the server (4) information obtained by the monitoring operation of the client side module (13) in accordance with the second specification.

32 Claims, 5 Drawing Sheets

(58) Field of Classification Search
USPC ........................................................... 726/4
See application file for complete search history.

(56) References Cited

U.S. PATENT DOCUMENTS

| | | | | |
|---|---|---|---|---|
| 9,038,184 | B1 * | 5/2015 | Mann | G06F 21/563 726/24 |
| 9,672,338 | B1 * | 6/2017 | Kim | H04W 12/08 |
| 10,922,631 | B1 * | 2/2021 | Shahidzadeh | H04W 4/029 |
| 11,276,106 | B2 * | 3/2022 | Hwu | G06Q 30/0627 |
| 2007/0239604 | A1 | 10/2007 | Oconnell et al. | |
| 2009/0271514 | A1 * | 10/2009 | Thomas | G06F 11/3438 709/224 |
| 2014/0026081 | A1 * | 1/2014 | O'donnell | G06F 11/34 715/760 |
| 2014/0201351 | A1 * | 7/2014 | Fransen | H04L 67/535 709/224 |
| 2015/0046216 | A1 | 2/2015 | Adjaoute | |
| 2018/0034850 | A1 | 2/2018 | Turgeman | |
| 2021/0021633 | A1 * | 1/2021 | Landman | H04L 63/1433 |

OTHER PUBLICATIONS

"Continuous Authentication", OneSpan, Jan. 24, 2021, 6 pages, https://web.archive.org/web/20210124224335/https://www.onespan.com/topics/continuous-authentication.

"To Step Up or Not to Step Up: Reducing Friction with Continuous Authentication", BioCatch, Jun. 25, 2018, 8 pages, https://www.biocatch.com/blog/continuous-authentication-reduce-friction.

International Search Report for PCT/GB2021/050665 mailed Nov. 9, 2021, 4 pages.

Written Opinion of the ISA for PCT/GB2021/050665 mailed Nov. 9, 2021, 17 pages.

* cited by examiner

MONITORING USER INTERACTION WITH CLIENT DEVICES

This application is the U.S. national phase of International Application No. PCT/GB2021/050665 filed Mar. 17, 2021 which designated the U.S., the entire contents of which are hereby incorporated by reference.

This invention relates to monitoring user interaction with client devices, say web enabled devices, in particular monitoring user interaction with a web enabled device using a client side module running within a web client on the web enabled device.

Providing systems for authenticating users and helping prevent fraud is an issue of significant importance. Ideally authentication systems are effective and convenient for users.

It has been recognised by the applicants that various aspects of a user's interaction with a web page and a web enabled device can be characteristic of a particular user and as such these characteristics can be considered as biometric information and be useful in authenticating a user. This authentication can be carried out without any proactive action by the user, so is attractive. However using such a system will likely necessitate the gathering of a high volume of data in respect of user interaction with a web enabled device or a web page loaded on the web enabled device and this can create technical issues.

There are existing systems for monitoring user interaction with web pages loaded into a web client such as a browser. Such systems allow the monitoring of various kinds of user interactions with a web page at differing levels of granularity. Due to the amount of processing which is required at the client side module, and the time that this may take and the detrimental effect that this may have on user experience and/or the volume of data that must be sent to the server device and/or the complexities of processing massive amounts of data at the central server it is impractical with existing systems to monitor all possible types of user interaction with a web enabled device and report these to a server. The precise details of the monitoring which is carried out is typically determined in a one time operation which sets up a client side module (or data collection agent) to perform monitoring of certain user interactions and report these user interactions back to a monitoring server device. This has restrictions and can cause issues if the system is set to capture very high volumes of data.

To facilitate user authentication and for other reasons it would be desirable to provide the facility to collect high volumes of data relating to user interactions with a client device say a web enabled device to enable enhanced functionality but at the same time arrive at a practical system which does not overwhelm computer or network resources.

According to one aspect of the present invention there is provided a web enabled device arranged for monitoring user interaction with the web enabled device, the web enabled device being arranged under the control of software to:

run a web client for loading and displaying webpages to a user;

run a client side module within the web client;

send, using the client side module, data to a server; and carry out a monitoring operation, using the client side module, to monitor user interaction with at least one of the web enabled device and, via the web enabled device, a webpage loaded in the web client on the web enabled device, wherein the web enabled device is arranged under the control of software to:

receive from the server a first configuration message, which message is arranged to configure the monitoring operation of the client side module so as to cause monitoring of user interaction according to a first specification;

configure the client side module using the first configuration message and send to the server, using the client side module, information obtained by the monitoring operation of the client side module in accordance with the first specification;

receive from the server a second configuration message, which message is arranged to configure the monitoring operation of the client side module so as to cause monitoring of user interaction according to a second specification; and configure the client side module using the second configuration message and send to the server, using the client side module, information obtained by the monitoring operation of the client side module in accordance with the second specification.

This allows dynamic monitoring of user interaction with the web enabled device. In particular, it allows, for example, for the monitoring to be conducted at the web enabled device to be modified based on monitoring information obtained at the web enabled device and sent to the server. Moreover, this is facilitated in a scalable way where, by use of a configurable client side module, dynamic monitoring can be provided across multiple different websites using a common monitoring tool—that is with different instances of the client side module. Typically the first specification will be different from the second specification.

The dynamic monitoring may be used in a way to target more detailed/granular monitoring to situations where this is appropriate. For example, these techniques can be used to assist in user identification/authentication, say for the purpose of fraud prevention, by increasing monitoring activity where determined appropriate, based on the monitoring information obtained at the web enabled device whilst avoiding issues that may result from excessive volumes of data being collected at all times.

Preferably the monitoring of user interaction according to the first specification comprises monitoring user interaction with the web page loaded in the web client. Preferably the monitoring of user interaction according to the second specification comprises monitoring user interaction with the web page loaded in the web client.

In some cases the monitoring of user interaction according to the first specification and/or the second specification comprises monitoring user interaction with the web page loaded in the web client and monitoring user interaction with the web enabled device which is distinct from interaction with the web page loaded in the web client and yet is detectable from within the web client by the client side module.

Such a user interaction with the web enabled device which is distinct from interaction with the web page loaded in the web client may comprise at least one of orientation changes and translational movement of the web enabled device.

As will be appreciated web enabled devices are, in some cases, provided with detection systems for:

i) detecting the orientation and/or changes in orientation of the device; and/or ii) detecting the location and/or changes in location of the device.

Where such detection systems are present and their outputs are available to the client side module running the web client, these outputs can be used in monitoring user interaction with the web enabled device.

Another category of user interactions with the web enabled device, which can be monitored, also manifest themselves as user interactions with the web page loaded in the web client. These include:

i) mouse (or cursor) movements, including:—position, left click, right click, hover.
ii) gestures, including:—swipe, zoom, pan, scroll
iii) keyboard interactions, including:—typing speed, key press duration, key press pressure.

Data which can be gathered from interactions of either or both of the above types can be useful in identifying the user. A user will tend to have characteristic behaviours—for example in terms of an angle which they tend to hold the device, a typing speed, a speed of swiping etc, etc. Thus a profile for a user may be determined using one or more of these parameters and departure from this profile can be used to determine that there is a doubt as to a users identity. If such a doubt is raised in server side analysis then a new configuration message may be sent which changes, say increases, the monitoring which is conducted. This change may be for a specified period or until a further configuration message is sent.

In some cases a change in configuration may be prompted based on an operation which a user is about to carry out using the webpage, or when beginning to interact with a part of a webpage. A combination of factors may be used—a confidence level that the user is the "normal/correct" user and the operation/web page part. Thus, for example, if there is lower than typical confidence that the user is the "normal/correct" user and a purchase is about to be made, the client side module may receive a configuration message causing enhanced monitoring. In some cases, the system can be arranged so that, the further user interaction is away from the expected, the higher the increase in monitoring which is configured. Generally such analysis is carried out server side and the effects are seen at the web enabled device in terms of changes in configuration.

As an example, the first configuration message may configure the client side module to monitor an angle at which the web enabled device is held. Subsequently, if it is determined that the web enabled device is being held at an unexpected angle a second configuration message may configure the client side module to monitor whether the web enabled device is moving.

Subsequently (or alternatively) a further configuration message may configure the client side module to monitor more detailed interaction with the web enabled device and/or webpage loaded on the web enabled device such as key press biometrics or gestures such as swipe, zoom, pan.

More generally the first configuration message may configure the client side module to monitor a first parameter and the second configuration message may configure the client side module to monitor at least one of:

a second parameter which is different from the first parameter in place of monitoring the first parameter;

the first parameter but with sampling specification which differs from a sampling specification with which the first parameter is sampled in response to the first configuration message; and the first parameter and at least one further parameter.

Here a sampling specification means a detail about how the respective parameter is to be sampled—for example it might specify a frequency at which the parameter should be sampled—i.e. measured, or a resolution or accuracy at which the parameter should be sampled. This recognises that there are different ways to increase monitoring—more parameters may be monitored and/or one parameter can be measured at greater resolution and/or more frequently. Another example of a sampling specification may be the characteristics of an algorithm to be used during monitoring by the client side module. Thus a configuration message may be arranged to cause switching from a first algorithm to a second algorithm which has a different quality than the first algorithm. The different quality may be a higher quality or a lower quality. Here higher quality may mean at least one of: the algorithm is more processing power intensive, more accurate, provides higher granularity, generates more data.

In another example the first configuration message may be arranged to configure the client side module to collect auxiliary information and hold this auxiliary information at the web enabled device, whilst sending said monitoring information to the server.

In such a case the second configuration message may be arranged to configure the client side module to send said auxiliary information, which was collected at the web enabled device before receipt of the second configuration message, to the server after the receipt of the second configuration message.

The auxiliary information may comprise additional monitoring information.

In one set of embodiments, a) the first configuration message is arranged to configure the monitoring operation of the client side module so as to cause monitoring of user interaction according to a first specification;
b) the second configuration message is arranged to:
i) configure the monitoring operation of the client side module so as to cause monitoring of user interaction according to the first specification; and
ii) configure the client side module to collect auxiliary information and hold this auxiliary information at the web enabled device, whilst sending said monitoring information to the server obtained in accordance with the first specification; and
c) a subsequent configuration message is arranged to configure the client side module to send said auxiliary information, which was collected at the web enabled device before receipt of the subsequent configuration message, to the server after the receipt of the subsequent configuration message.

In this case it can be considered that monitoring of user interaction according to the second specification comprises monitoring of user interaction according to the first specification plus collecting said auxiliary information.

As alluded to above at least some of the monitoring, and say parameters selected, may be chosen with the aim of checking or collecting "Biometric" data associated with the user—that is data that is characteristic to that user that can be used in confirming identity of the user.

In some cases it may be helpful to carry out some (pre-)processing of the monitoring data at the web enabled device—again the client side module may be arranged for carrying out such processing.

At least one of the monitoring operation according to the first specification and the monitoring operation according to the second specification may comprise, at the client side module, processing data obtained by monitoring user interaction with at least one of the web enabled device and a webpage loaded in the web client on the web enabled device to generate said respective information obtained by the monitoring operation for sending to the server.

That is to say, the monitoring operation may include taking raw data obtained by monitoring user interactions and processing this before output to the server, with the client side module arranged to carry out this processing. Whether such processing is conducted and the nature of this processing may be controlled by the respective configuration message.

As an example the raw data may be filtered according to one or more filter condition by the client side module—this filtering condition may be provided by and/or adjusted by the respective configuration message. As another example the client side module may be arranged to analyse the raw data in accordance with an algorithm/model which may be provided by and/or adjusted by the respective configuration message.

The client side module may be arranged for receiving both the first configuration message and the second configuration message whilst said webpage is loaded in the web client and the client side module may be arranged for carrying out the monitoring operation according to the first specification and carrying out the monitoring operation according to the second specification whilst said webpage is loaded in the web client.

That is to say, in such a case, that the two configurations are both used whilst the same web page is loaded in the web client—with the second configuration being used at a later time than the first configuration.

The client side module may run within the webpage loaded in the web client.

The client side module may be arranged for receiving both the first configuration message and the second configuration message whilst running in the webpage loaded in the web client and the client side module may be arranged for carrying out the monitoring operation according to the first specification and carrying out the monitoring operation according to the second specification whilst running in said webpage.

Again here the two configurations are both used whilst the same web page is loaded in the web client—with the second configuration being used at a later time than the first configuration.

The web enabled device may be arranged under the control of software to:

- receive from the server subsequent configuration messages, each of which messages is arranged to configure the monitoring operation of the client side module so as to cause monitoring of user interaction according to a respective subsequent specification; and
- configure the client side module using each subsequent configuration message and send to the server, using the client side module, information obtained by the monitoring operation of the client side module in accordance with the respective subsequent specification.

Typically the subsequent specification will be different from the second specification. The subsequent specification may be different from the first specification, though in some cases it might quite reasonably be the same as the first specification—i.e. to step monitoring back down.

The client side module may be arranged for receiving the first configuration message, the second configuration message, and the subsequent configuration messages whilst said webpage is loaded in the web client.

The client side module may be arranged for carrying out the monitoring operation according to the first specification whilst said webpage is loaded in the web client, carrying out the monitoring operation according to the second specification whilst said webpage is loaded in the web client, and carrying out the monitoring operation according to the respective subsequent specifications whilst said webpage is loaded in the web client.

That is, again, these different configurations may all be adopted whilst the same webpage is loaded in the web client. Further the client side module may be running within said webpage during these operations.

The first configuration message may comprise an initial configuration for the client side module and the client side module may be arranged under software to fall back to said initial configuration after having been configured in accordance with the second configuration where fall back conditions are met.

The fall back conditions may comprise the elapse of a predetermined period of time. That is to say, in such a case, the client side module may be arranged fall back to the initial configuration after a predetermined period of time operating in accordance with the second configuration.

This can avoid, for example, enhanced (potentially high volume) data collection for an unintentionally long period.

According to another aspect of the present invention there is provided a user interaction monitoring server device arranged for monitoring user interaction with a web enabled device where there is a client side module running within a web client on the user web enabled device for carrying out a monitoring operation to monitor user interaction with at least one of the web enabled device and a webpage loaded in the web client on the web enabled device, the user interaction monitoring server device being arranged under the control of software to:

- receive data from the client side module running within the web client on the user web enabled device;
- send from the server to the client side module running within the web client on the user web enabled device a first configuration message, which message is arranged to configure the monitoring operation of the client side module so as to cause monitoring of user interaction according to a first specification;
- receive at the server from the client side module running within the web client on the user web enabled device information obtained by the monitoring operation of the client side module in accordance with the first specification;
- analyse the information received from the client side module;
- determine whether the information received from the client side module meets predetermined criteria such that a change in configuration of the client side module is justified; and
- where it is determined that a change in configuration of the client side module is justified,
- send from the server to the client side module running within the web client on the user web enabled device, a second configuration message, which message is arranged to configure the monitoring operation of the client side module so as to cause monitoring of user interaction according to a second specification.

Where it is determined that a change in configuration of the client side module is not justified, the server needs take no action in this regard and will continue to receive information as monitoring continues. As this further information is received checks can again be made as to whether a change in configuration is justified.

Data initially received from the client side module running within the web client on the user web enabled device may serve the purpose of indicating that the client side module is active.

The first configuration message may comprise an initial configuration for the client side module.

The user interaction monitoring server device may be arranged under the control of software to determine an appropriate change in data to be collected at the client side module and hence determine a content of the second configuration message once a determination has been made that a change in configuration of the client side module is justified and before sending the second configuration message to the client.

In a simple set up there may just be two possible configurations, say "basic" and "enhanced" monitoring, and the second configuration message will be used to set the "enhanced" configuration. This then does not need determination of an appropriate change—there is one change that can be made. Preferably however, the server device under control of software is arranged to determine an appropriate change amongst a plurality of possible changes in reaction to its analysis.

The user interaction monitoring server device may be arranged under the control of software to provide an analysis and decision module configured to analyse the information received from the client side module and determine whether the information received from the client side module meets predetermined criteria such that a change in configuration of the client side module is justified.

The analysis and decision module may be arranged under the control of software to determine an appropriate change in data to be collected at the client side module once a determination has been made that a change in configuration of the client side module is justified and before sending the second configuration message to the client.

The user interaction monitoring server device may be arranged to send an alert message in response to an alert condition being determined by the analysis and decision module. The alert message may be sent to a second server which is external to the user interaction monitoring server running on the user interaction monitoring server computer device.

Such a message typically will be a message to a separate computing device, but in some instances said second server may be running on the same physical device as the user interaction monitoring server.

The alert message may be a particular type of configuration message sent to the client side module.

The alert message may be configured to at least one of:

prevent a transaction being conducted via the monitored web page;

prevent navigation by the web client to at least one identified webpage from the web page loaded in the web client;

alert the second server to a potential issue.

The user interaction monitoring server device may be arranged under the control of software to:

receive at the server from the client side module running within the web client on the user web enabled device information obtained by the monitoring operation of the client side module in accordance with the second specification;

analyse the information received from the client side module;

determine whether the information received from the client side module meets predetermined criteria such that a change in configuration of the client side module is justified; and where it is determined that a change in configuration of the client side module is justified, send from the server to the client side module running within the web client on the user web enabled device, a subsequent configuration message, which message is arranged to configure the monitoring operation of the client side module so as to cause monitoring of user interaction according to a subsequent specification.

The user interaction monitoring server device may be arranged under the control of software, as part of determining whether a change in configuration of the client side module is justified, to compare user behaviour as identified from the information received from the client side module with expected user behaviour held in a store in respect of an authorised user of the web page loaded in the web client.

Here an authorised user may for example be an owner of an account, such as say a bank account, who is able to log on to a session to access web pages associated with that account, say who is able to log on to an online banking service for their bank account provided via the web pages being monitored. The authorised user of the web page in this regard is the actual owner of the account—the correct person to be accessing the service being provided via the page at that point in time.

The store may be provided at the user interaction monitoring server device or accessed from a remote location.

The user interaction monitoring server device may be arranged under the control of software, as part of determining whether a change in configuration of the client side module is justified, to use a machine learning technique. The user interaction monitoring server device may be arranged under the control of software, as part of determining whether a change in configuration of the client side module is justified, to use at least one of a neural network, linear regression, and a decision tree.

The user interaction monitoring server device may be arranged under the control of software to make use of at least one of: a machine learning technique, a neural network, linear regression, and a decision tree to compare user behaviour as identified from the information received from the client side module with expected user behaviour held in a store in respect of an authorised user of the web page loaded in the web client.

The user interaction monitoring server device may be arranged under the control of software to determine that a change in configuration of the client side module is at least potentially justified when a difference between the user behaviour as identified from the information received from the client side module and the expected user behaviour exceeds a threshold.

In some cases such a determination may be enough to allow a decision that change in configuration of the client side module is justified so that a change in configuration will be initiated.

In other cases the user interaction monitoring server device may be arranged under the control of software to determine whether other predetermined conditions are met before a change in configuration will be initiated.

Thus the user interaction monitoring server device may be arranged under the control of software to:

i) determine that a change in configuration of the client side module is at least potentially justified when a difference between the user behaviour as identified from the information received from the client side module and the expected user behaviour exceeds a threshold;

ii) determine whether other predetermined conditions are met; and where i) and ii) are determined, to send from the server to the client side module running within the web client on the user web enabled device, a second configuration message, which message is arranged to configure the monitoring operation of the client side module so as to cause monitoring of user interaction according to a second specification.

Said predetermined conditions may comprise at least one of:

a determination of whether a change in configuration of the client side module has potential usefulness towards an aim of the monitoring operation; and a determination of whether the activity being conducted via the web page loaded in the web client falls within a predefined category of activities.

Here the determination of whether a change in configuration has potential usefulness allows the system to operate in a way where changes in configuration are not made when they would serve no useful purpose. As an example, if the aim is to attempt to identify whether a user is an authorised user, and at that point in time there is insufficient data on that user regarding their expected behaviour in one or more regard, there might be little to be gained by increasing monitoring in respect of that behaviour if existing indications raised a doubt as to whether it was indeed the authorised user.

Here the determination of whether the activity being conducted via the web page loaded in the web client falls within a predefined category of activities allows the system to operate in a way where activities may be predefined as say sensitive and/or high risk—such as completing a form with data, or initiating a purchase or a movement of funds. For example, in such a case a further configuration message may be sent, but not where the activities are not in one of these categories.

Such a check as to whether the activities at the web client are high risk can be carried out without any comparison of the detected user behaviour and expected user behaviour in some cases.

The user interaction monitoring server device may be arranged under the control of software, as part of determining whether a change in configuration of the client side module is justified, to determine whether the activity being conducted via the web page loaded in the web client falls within a predefined category of activities.

The user interaction monitoring server device may be arranged under the control of software, as part of determining whether a change in configuration of the client side module is justified, to compare user behaviour as identified from the information received from the client side module with expected user behaviour held in a store in respect of an authorised user of the web page loaded in the web client; and to determine a score which is indicative of how closely the user behaviour as identified from the information received from the client side module matches with expected user behaviour.

The user interaction monitoring server device may be arranged under the control of software, as part of determining an appropriate change in data to be collected at the client side module and hence determining a content of the second configuration message, to determine a content of the second configuration message based on said score.

This allows the content of the second configuration message to be tailored to the score and in particular to how far the detected behaviour differs from the expected behaviour.

The user interaction monitoring server device may be arranged under the control of software to use at least one of a machine learning technique, a neural network, linear regression, and a decision tree in determining at least one of said score and a content of the second configuration message.

The user interaction monitoring server device may be arranged under the control of software to select the content of the second configuration message so as to give a lower level of monitoring when a first score is determined than when a second score is determined where the second score is indicative of the detected behaviour being further from the expected behaviour than the first score.

The user interaction monitoring server device may be arranged under the control of software to:

i) select the content of the second configuration message so as to cause the client side module to monitor a first parameter when a first score is determined; and ii) select the content of the second configuration message so as to cause the client side module to monitor said first parameter and a second parameter when a second score is determined where the second score is indicative of the detected behaviour being further from the expected behaviour than the first score.

The user interaction monitoring server device may be further arranged under the control of software to:

iii) select the content of the second configuration message so as to cause the client side module to monitor said first parameter, said second parameter, and a third parameter when a third score is determined where the third score is indicative of the detected behaviour being further from the expected behaviour than the second score.

As an example the first parameter might be movement of the web enabled device, the second parameter might be key press pressure, the third parameter might be typing speed.

The user interaction monitoring server device may be arranged under the control of software to:

store a table of entries, each entry comprising one of a score and a score range and at least one monitoring characteristic associated with said one of a score and a score range;

wherein each monitoring characteristic comprises at least one of a parameter and a parameter and sampling specification pair; and the user interaction monitoring server device is arranged under the control of software to select the content of the second configuration message based on the at least one monitoring characteristic which is associated in the table with said one of a score and a score range which matches the determined score indicating how closely the user behaviour as identified from the information received from the client side module matches with expected user behaviour.

Here a parameter and sampling specification pair means a parameter and a detail about how this is to be sampled—for example it might specify a frequency at which the parameter should be sampled—i.e. measured, or a resolution or accuracy at which the parameter should be sampled. This recognises that there are different ways to increase monitoring—more parameters may be monitored and/or one parameter can be measured at greater resolution and/or more frequently.

More generally the first configuration message may configure the client side module to monitor a first parameter and the second configuration message may configure the client side module to monitor at least one of:

a second parameter which is different from the first parameter in place of monitoring the first parameter;

the first parameter but with sampling specification which differs from a sampling specification with which the first parameter is sampled in response to the first configuration message; and the first parameter and at least one further parameter.

Here a sampling specification means a detail about how the respective parameter is to be sampled—for example it might specify a frequency at which the parameter should be sampled—i.e. measured, or a resolution or accuracy at which the parameter should be sampled. This recognises that there are different ways to increase monitoring—more parameters may be monitored and/or one parameter can be measured at greater resolution and/or more frequently.

Another example of a sampling specification may be the characteristics of an algorithm to be used during monitoring. Thus a configuration message may be arranged to cause switching from a first algorithm to a second algorithm which has a different quality than the first algorithm. The different quality may be a higher quality or a lower quality. Here higher quality may mean at least one of: the algorithm is more processing power intensive, more accurate, provides higher granularity, generates more data.

In another example the first configuration message may be arranged to configure the client side module to collect auxiliary information and hold this auxiliary information at the web enabled device, whilst sending said monitoring information to the server.

In such a case the second configuration message may be arranged to configure the client side module to send said auxiliary information, which was collected at the web enabled device before receipt of the second configuration message, to the server after the receipt of the second configuration message.

The auxiliary information may comprise additional monitoring information.

In one set of embodiments, a) the first configuration message is arranged to configure the monitoring operation of the client side module so as to cause monitoring of user interaction according to a first specification;

b) the second configuration message is arranged to:

i) configure the monitoring operation of the client side module so as to cause monitoring of user interaction according to the first specification; and ii) configure the client side module to collect auxiliary information and hold this auxiliary information at the web enabled device, whilst sending said monitoring information to the server obtained in accordance with the first specification; and c) a subsequent configuration message is arranged to configure the client side module to send said auxiliary information, which was collected at the web enabled device before receipt of the subsequent configuration message, to the server after the receipt of the subsequent configuration message.

In this case it can be considered that monitoring of user interaction according to the second specification comprises monitoring of user interaction according to the first specification plus collecting said auxiliary information.

As alluded to above at least some of the monitoring, and say parameters selected, may be chosen with the aim of checking or collecting "Biometric" data associated with the user—that is data that is characteristic to that user that can be used in confirming identity of the user.

Note that in general, above, wherever reference is made to the second configuration message and associated second specification the same feature is also applicable to subsequent configuration messages and associated subsequent specifications.

According to another aspect of the present invention there is provided a user interaction monitoring system for monitoring user interaction with a web enabled device, comprising a web enabled device arranged under the control of software as defined above and a user interaction monitoring server device arranged for monitoring user interaction with the web enabled device as defined above.

According to another aspect of the present invention there is provided a user interaction monitoring system for monitoring user interaction with a web enabled device comprising a web enabled device and a user interaction monitoring server device, the web enabled device being arranged under the control of software to:

run a web client for loading and displaying webpages to a user;

run a client side module within the web client;

send, using the client side module, data to the server device; and carry out a monitoring operation, using the client side module, to monitor user interaction with at least one of the web enabled device and, via the web enabled device, a webpage loaded in the web client on the web enabled device, wherein the web enabled device is arranged under the control of software to:

receive from the server device a first configuration message, which message is arranged to configure the monitoring operation of the client side module so as to cause monitoring of user interaction according to a first specification;

configure the client side module using the first configuration message and send to the server device, using the client side module, information obtained by the monitoring operation of the client side module in accordance with the first specification;

receive from the server device a second configuration message, which message is arranged to configure the monitoring operation of the client side module so as to cause monitoring of user interaction according to a second specification; and configure the client side module using the second configuration message and send to the server device, using the client side module, information obtained by the monitoring operation of the client side module in accordance with the second specification;

and the user interaction monitoring server device being arranged under the control of software to:

receive data from the client side module running within the web client on the user web enabled device;

send from the server device to the client side module running within the web client on the user web enabled device the first configuration message, which message is arranged to configure the monitoring operation of the client side module so as to cause monitoring of user interaction according to the first specification;

receive at the server device from the client side module running within the web client on the user web enabled device information obtained by the monitoring operation of the client side module in accordance with the first specification;

analyse the information received from the client side module;

determine whether the information received from the client side module meets predetermined criteria such that a change in configuration of the client side module is justified; and where it is determined that a change in configuration of the client side module is justified, send from the server device to the client side module running within the web client on the user web enabled device, the second configuration message, which message is arranged to configure the monitoring operation of the client side module so as to cause monitoring of user interaction according to the second specification.

The web enabled device may be arranged under software to provide user authentication based on the monitoring of user interaction with the web enabled device as defined above.

The user interaction monitoring system may be arranged under software to provide user authentication based on the monitoring of user interaction with the web enabled device as defined above.

Here by provide user authentication is meant, to determine that a user currently using the web enabled device to access a service or account via a webpage loaded in the web client of the web enabled device is, at least to a predetermined confidence level, an authorised user of the service or account.

According to another aspect of the present invention there is provided a method of monitoring user interaction with a web enabled device, comprising the steps of:

running a web client for loading and displaying webpages to a user on the web enabled device;

running a client side module within the web client;

sending, using the client side module, data to a server; and carrying out a monitoring operation, using the client side module, to monitor user interaction with at least one of the web enabled device and, via the web enabled device, a webpage loaded in the web client on the web enabled device, wherein the method comprises the further steps of:

receiving from the server a first configuration message, which message is arranged to configure the monitoring operation of the client side module so as to cause monitoring of user interaction according to a first specification;

configuring the client side module using the first configuration message and sending to the server, using the client side module, information obtained by the monitoring operation of the client side module in accordance with the first specification;

receiving from the server a second configuration message, which message is arranged to configure the monitoring operation of the client side module so as to cause monitoring of user interaction according to a second specification; and configuring the client side module using the second configuration message and sending to the server, using the client side module, information obtained by the monitoring operation of the client side module in accordance with the second specification.

According to another aspect of the present invention there is provided a method of monitoring user interaction with a web enabled device where there is a client side module running within a web client on the user web enabled device for carrying out a monitoring operation to monitor user interaction with at least one of the web enabled device and a webpage loaded in the web client on the web enabled device, the method comprising using a user interaction monitoring server device to carry out the steps of:

receiving data from the client side module running within the web client on the user web enabled device;

sending from the server to the client side module running within the web client on the user web enabled device a first configuration message, which message is arranged to configure the monitoring operation of the client side module so as to cause monitoring of user interaction according to a first specification;

receiving at the server from the client side module running within the web client on the user web enabled device information obtained by the monitoring operation of the client side module in accordance with the first specification;

analysing the information received from the client side module;

determining whether the information received from the client side module meets predetermined criteria such that a change in configuration of the client side module is justified; and where it is determined that a change in configuration of the client side module is justified, sending from the server to the client side module running within the web client on the user web enabled device, a second configuration message, which message is arranged to configure the monitoring operation of the client side module so as to cause monitoring of user interaction according to a second specification.

The method may comprise the step of authenticating a user based on the monitoring of user interaction with the web enabled device as defined above. Here by authenticating a user is meant, to determine that a user currently using the web enabled device to access a service or account via a webpage loaded in the web client of the web enabled device is, at least to a predetermined confidence level, an authorised user of the service or account.

In some instances the present ideas may be used in relation to services which are provided over a network to a client device using an architecture that does not involve the delivery of web pages or a web client as such. In such a case a software application at the client—say an "APP" installed on a mobile device—can be the software via which a user interacts and via which monitoring is of interest. In such cases many of the present ideas are still applicable, and operation, particularly from the point of view of the server may be much the same. Again configuration messages may be sent to the client device to control its monitoring operation, in particular operation of the software application, and again the content of the configuration messages may be determined based on an analysis of the information obtained during monitoring in particular carried out under the control of the software application. Thus where there is a software application of this type rather than a client side module at the client device then the majority of the features defined above in relation to a client side module are also applicable in relation to such a software application at the client device and those features for example could be re-written here to mention "software application" in place of "client side module" and to mention "a service accessed using the software application" rather than via a webpage but this is not done in the interest of brevity. The provision of a web client and a client side module running within the web client can be considered a special case of the provision of a software application at the client device. So it may be expressed that in some sets of embodiments the software application comprises a web client and in particular may comprise a web client running a client side module.

According to another aspect of the present invention there is provided a client device arranged for monitoring user interaction with the client device, the client device being arranged under the control of software to:

run a software application for providing access to a service provided over a network to a user of the client device;

send, using the software application, data to a server; and carry out a monitoring operation, using the software application, to monitor user interaction with at least one of the client device and, via the client device, the service provided to the user by the software application on the client device, wherein the client device is arranged under the control of software to:

receive from the server a first configuration message, which message is arranged to configure the monitoring operation of the software application so as to cause monitoring of user interaction according to a first specification;

configure the software application using the first configuration message and send to the server, using the software application, information obtained by the monitoring operation of the software application in accordance with the first specification;

receive from the server a second configuration message, which message is arranged to configure the monitoring operation of the software application so as to cause monitoring of user interaction according to a second specification; and configure the software application using the second configuration message and send to the server, using the software application, information obtained by the monitoring operation of the software application in accordance with the second specification.

The client device may be a web enabled device. The client device may be a web enabled device as defined above. The software application may comprise a web client and in particular may comprise a web client running a client side module.

According to another aspect of the present invention there is provided a user interaction monitoring server device arranged for monitoring user interaction with a client device on which is running a software application arranged to carry out a monitoring operation to monitor user interaction with at least one of the client device and a service accessed via the client device, the user interaction monitoring server device being in communication with the client device over a network in use and being arranged under the control of software to:

receive data from the software application running on the client device; send from the server to the client device a first configuration message, which message is arranged to configure the monitoring operation of the software application so as to cause monitoring of user interaction according to a first specification;

receive at the server from the software application running on the client device information obtained by the monitoring operation of the software application in accordance with the first specification;

analyse the information received from the software application;

determine whether the information received from the software application meets predetermined criteria such that a change in configuration of the software application is justified; and where it is determined that a change in configuration of the software application is justified, send from the server to the software application running on the client device, a second configuration message, which message is arranged to configure the monitoring operation of the software application so as to cause monitoring of user interaction according to a second specification.

The user interaction monitoring server device may be arranged under the control of software to determine an appropriate change in data to be collected at the software application and hence determine a content of the second configuration message once a determination has been made that a change in configuration of the software application is justified and before sending the second configuration message to the client.

The user interaction monitoring server device may be arranged to send an alert message in response to an alert condition being determined at user interaction monitoring server device.

The user interaction monitoring server device may be arranged under the control of software, as part of determining whether a change in configuration of the software application is justified, to compare user behaviour as identified from the information received from the software application with expected user behaviour held in a store in respect of an authorised user of a service being accessed at the client device.

The user interaction monitoring server device may be arranged under the control of software to determine that a change in configuration of the software application is at least potentially justified when a difference between the user behaviour as identified from the information received from the software application and the expected user behaviour exceeds a threshold.

The user interaction monitoring server device may be arranged under the control of software to determine whether other predetermined conditions are met before a change in configuration is initiated.

The user interaction monitoring server device may be arranged under the control of software to:

i) determine that a change in configuration of the software application is at least potentially justified when a difference between the user behaviour as identified from the information received from the software application and the expected user behaviour exceeds a threshold;

ii) determine whether other predetermined conditions are met; and where i) and ii) are determined, to send from the server to the software application running on the client device, a second configuration message, which message is arranged to configure the monitoring operation of the software application so as to cause monitoring of user interaction according to a second specification.

The user interaction monitoring server device may be arranged under the control of software, as part of determining whether a change in configuration of the software application is justified, to determine whether the activity being conducted via a service being accessed at client device falls within a predefined category of activities.

The user interaction monitoring server device may be arranged under the control of software, as part of determining whether a change in configuration of the software application is justified, to compare user behaviour as identified from the information received from the software application with expected user behaviour held in a store in respect of an authorised user of a service being accessed at client device; and to determine a score which is indicative of how closely the user behaviour as identified from the information received from the client side module matches with expected user behaviour.

The user interaction monitoring server device may be arranged under the control of software, as part of determining an appropriate change in data to be collected at the software application and hence determining a content of the second configuration message, to determine a content of the second configuration message based on said score.

The user interaction monitoring server device may be arranged under the control of software to select the content of the second configuration message so as to give a lower level of monitoring when a first score is determined than when a second score is determined where the second score is indicative of the detected behaviour being further from the expected behaviour than the first score.

The user interaction monitoring server device may be arranged under the control of software to:

store a table of entries, each entry comprising one of a score and a score range and at least one monitoring characteristic associated with said one of a score and a score range;

wherein each monitoring characteristic comprises at least one of a parameter and a parameter and sampling specification pair; and the user interaction monitoring server device may be arranged under the control of software to select the content of the second configuration message based on the at least one monitoring characteristic which is associated in the table with said one of a score and a score range which matches the determined score indicating how closely the user behaviour as identified from the information received from the software application matches with expected user behaviour.

According to another aspect of the present invention there is provided a user interaction monitoring system for monitoring user interaction with a client device, comprising:

a client device arranged to run a software application which is arranged to carry out a monitoring operation to monitor user interaction with at least one of the client device and a service accessed via the client device; and a user interaction monitoring server device as defined above.

In one set of embodiments, the client device is a web enabled device where there is a client side module running within a web client on the user web enabled device and the client side module is arranged to carry out said monitoring operation at the client device and the user interaction monitoring server device is arranged to receive said data from the client side module, send said first configuration message to the client side module, receive said information obtained by the monitoring operation from the client side module and send said second configuration message to the client side module.

Thus in such a case the software application may comprise a web client and in particular may comprise a web client running a client side module.

According to another aspect of the present invention there is provided a user interaction monitoring system for monitoring user interaction with a web enabled device, comprising a web enabled device arranged under the control of software as defined above and a user interaction monitoring server device as defined above.

According to another aspect of the present invention there is provided a method of monitoring user interaction with a client device where there is a software application running on a client device for carrying out a monitoring operation to monitor user interaction with at least one of the client device and a service accessed via the client device, the method comprising using a user interaction monitoring server device to carry out the steps of:

receiving data from the software application running on the client device;

sending from the server to the software application running on a client device a first configuration message, which message is arranged to configure the monitoring operation of the software application so as to cause monitoring of user interaction according to a first specification;

receiving at the server from the software application running on the client device information obtained by the monitoring operation of the software application in accordance with the first specification;

analysing the information received from the software application;

determining whether the information received from the software application meets predetermined criteria such that a change in configuration of the software application is justified; and where it is determined that a change in configuration of the software application is justified, sending from the server to the software application running on the client device, a second configuration message, which message is arranged to configure the monitoring operation of the software application so as to cause monitoring of user interaction according to a second specification.

According to another aspect of the present invention there is provided a computer program comprising code portions which when loaded and run on a computer device cause the computer device to execute a method as a client device or a web enabled device as defined above and/or cause the computer device to constitute a client device or a web enabled device as defined above.

According to another aspect of the present invention there is provided a computer program comprising code portions which when loaded and run on a computer device cause the computer device to execute a method as a user interaction monitoring server device as defined above and/or cause the computer device to constitute a user interaction monitoring server device as defined above.

According to another aspect of the present invention there is provided a machine readable data carrier carrying a computer program as defined above. The carrier in this case may include a signal.

According to another aspect of the present invention there is provided at least one machine readable medium carrying a computer program as defined above.

Examples of a machine readable medium include a hard disc, a SSD, a DVD, a flash memory drive and so on.

In one set of embodiments the client side module may be obtained from a server by the web enabled device upon being called from code in the webpage loaded in the web client or the client side module may be loaded from a storage of the web enabled device having previously been delivered from the server, upon being called from code in the webpage. These methodologies are typically referred to as client side page tagging techniques.

In this specification the expression web client is used to refer to a software implemented tool that runs on a web enabled device and allows a user to load and display web pages, a common example of a web client is a browser—such as Chrome, Edge, Internet Explorer and so on.

In this specification the expression client side module is used to refer to a software implemented tool that runs within the web client on a web enabled device. Typically, a client side module will run within a browser. Most commonly a client side module runs within a webpage loaded in the web client. In such a case a client side module in current technologies will normally comprise a portion of JavaScript code.

In this specification the expression web enabled device is used to refer to any physical piece of equipment which may be used to access Web pages—typically via the Internet. Example web enabled devices include personal computers (be these PCs, Apple Mac, or any equivalent), mobile (cell) phone devices, tablet devices, and so on.

In this specification the expression client device is used to refer to any physical piece of equipment which may be used to access services over a network—typically via the Internet. Example client devices include personal computers (be these PCs, Apple Mac, or any equivalent), mobile (cell) phone devices, tablet devices, and so on.

In this specification the expression server device is used to refer to any physical piece of equipment which is arranged under software to operate as a server for communicating with the software application and in particular in a set of embodiments with the client side module.

The computer devices, client devices, web enabled devices and server devices on which the present invention can be embodied will typically include a collection of the conventional parts of computers such as Memory, Hard Drive or Solid State Drive, Video card, Motherboard, Processor, Power Supply, Output devices—Monitor/screen, speakers/headphone connection, Input devices—keyboard, mouse, touch screen and so on.

Note that, in general terms and with any necessary modifications in wording, all the further features defined above following any aspect of the invention above are applicable as further features of all other aspects of the invention defined above. These further features are not restated after each aspect of the invention merely for the sake of brevity.

Embodiments of the present invention will now be described, by way of example only, with reference to the accompanying drawings in which:

FIG. 1 schematically shows an architecture of a user interaction monitoring system for monitoring user interaction with a web enabled device;

Figure 4:
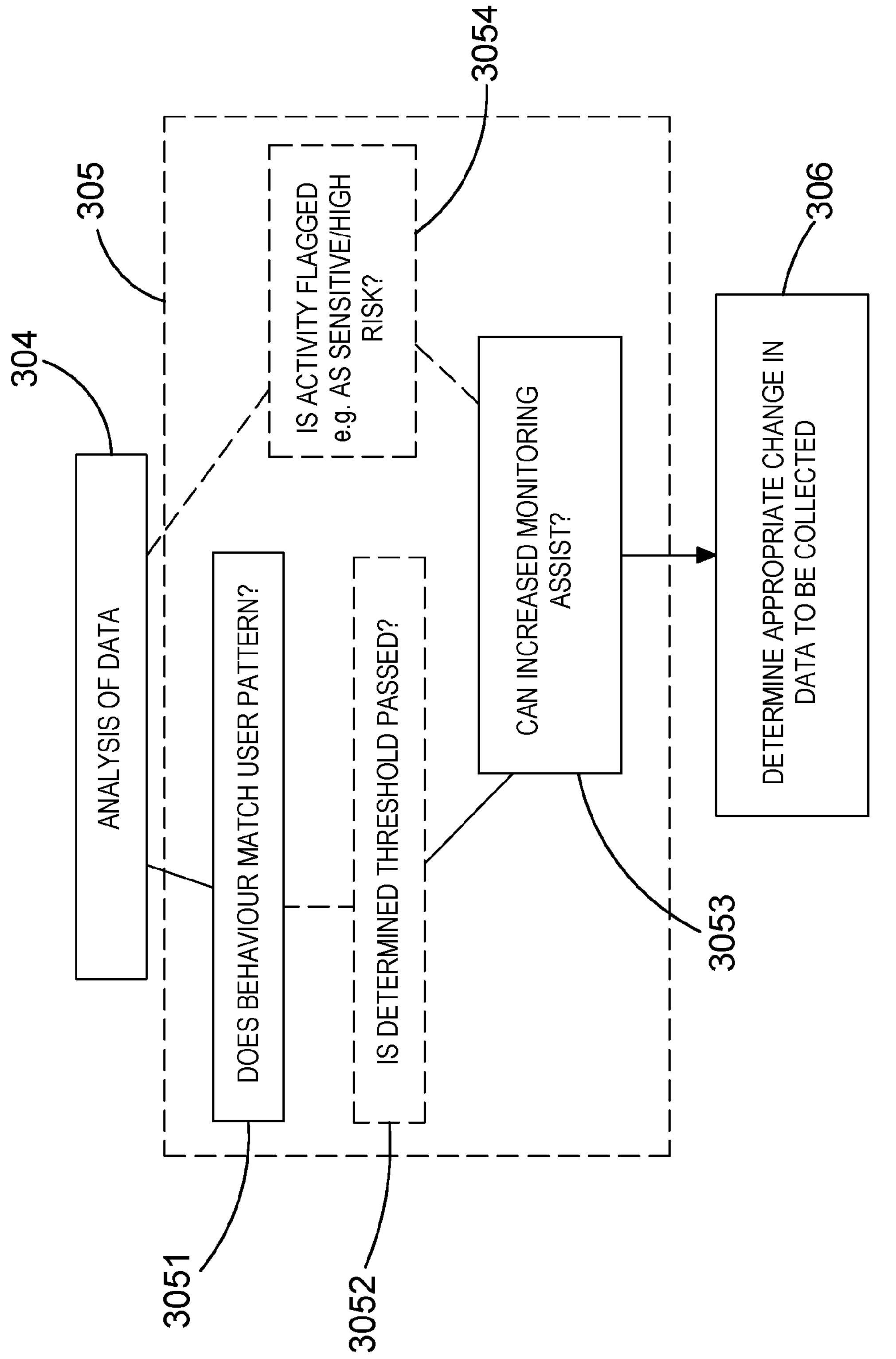
Figure 5A:
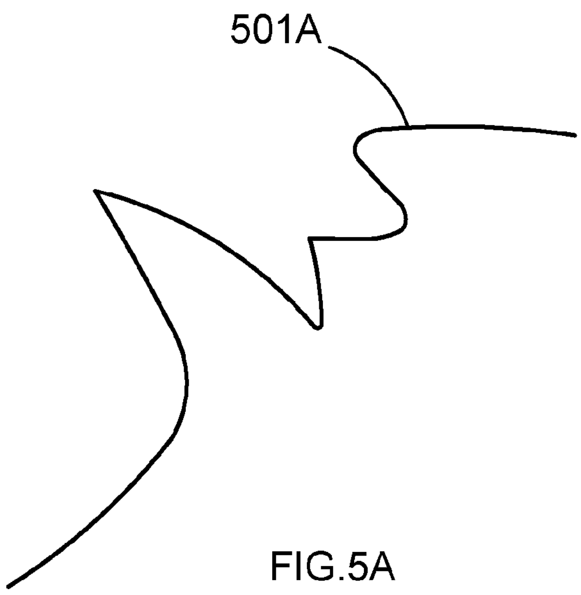
Figure 5B:
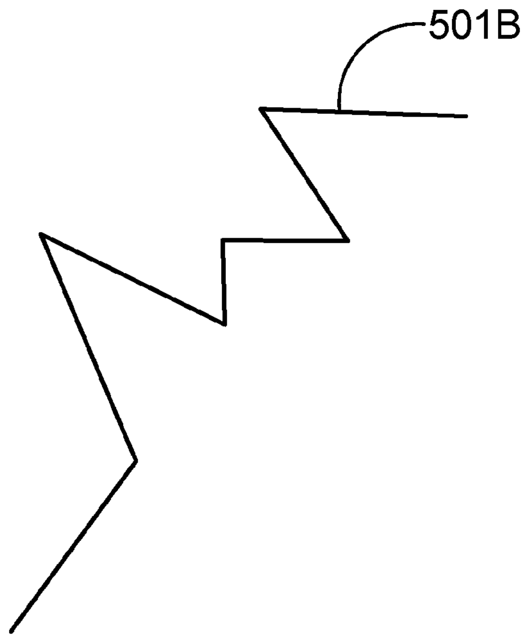

FIG. 4 is a flow chart schematically showing in more detail processes which occur at the configuration and collection server in analysing data received and determining whether it is appropriate to change what data is collected at the web enabled device; and FIGS. 5A and 5B schematically show traces which are illustrative of the output of two different algorithms which may be used for tracking cursor position.

Figure 1:
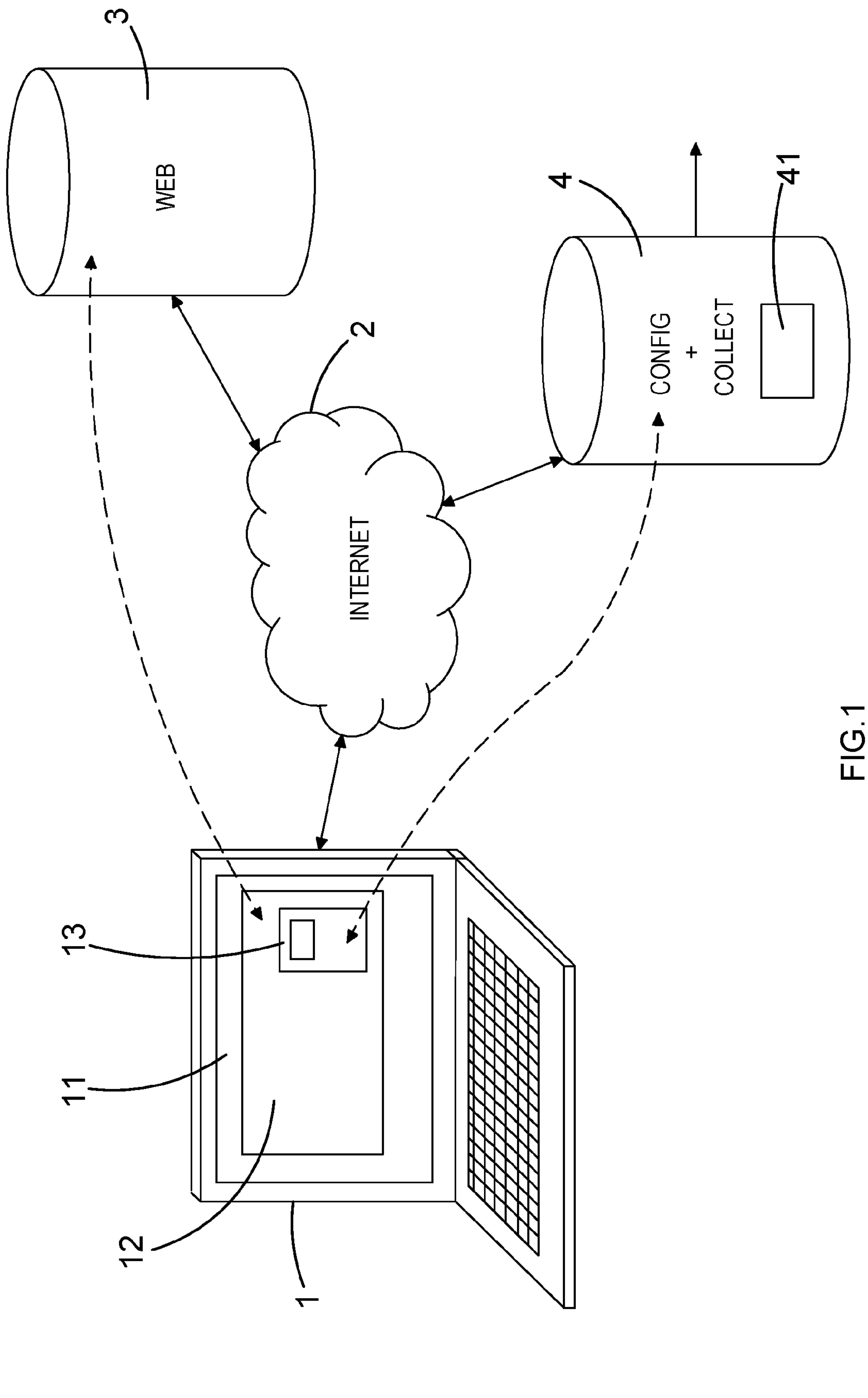

FIG. 1 schematically shows an architecture of a user interaction monitoring system for monitoring user interaction with a web enabled device 1. The web enabled device 1 is connected via the internet 2 to a web server 3 for providing web pages to the web enabled device 1. The web enabled device 1 is connected via the internet 2 to a configuration and collection server 4 which is arranged for sending configuration messages to the web enabled device 1 and for collecting monitoring information initially collected at the web enabled device 1 and sent to the configuration and collection server 4.

In the architecture shown in FIG. 1, only one web enabled device 1 is shown but it will be appreciated that in a practical system there may be multiple web enabled devices 1, each of which is appropriately connected via the internet 2, to the web server 3 and configuration and collection server 4. Further, in the architecture shown in FIG. 1 there is a single web server 3 and it will be appreciated that in a practical system there may be multiple web servers each connected to the internet 2 and thus each accessible from the web enabled device 1 and also accessible from any further web enabled devices which are provided.

As mentioned in the introduction the (or each) web enabled device 1 may be in the form of one of a number of different types of web enabled device—for example, a desk top PC or mobile communication device (i.e. mobile phone or cell phone) or a laptop as schematically indicated in FIG. 1. The web server 3 and configuration and collection server 4 are implemented on one or more server device. Again, as mentioned in the introduction, the or each server device will comprise at least one conventional computer arranged under the control of software.

The web enabled device 1 is arranged under the control of software to facilitate its communication via the internet in the conventional fashion. Furthermore, the web enabled device 1 is arranged to run a web client 11, typically a web browser, for loading web pages supplied by the web server 3 and displaying these web pages to a user. Furthermore, the web enabled device 1 is arranged for running a client side module 13 within the web client. Typically, this client side module will be arranged to run within a web page supplied from the web server 3. In particular, this client side module 13 in the current embodiment is a piece of script code, in particular JavaScript code which is arranged to run in a web page 12 supplied from the web server 3. In terms of actual implementation, most commonly and in the present embodiment the client side module 13 is provided to the web enabled device 1 by virtue of being called from the web page 12 which is supplied from the web server 3. That is to say the web page 12 is delivered from the web server 3 to the web enabled device 1 and this web page 12 includes a call to the client side module 13. At least for an initial time, this call will end up being directed via the internet 2 to the configuration and connection server 4 and the client side module 13 is then delivered to the web enabled device so as it may run in the web page 12. However, if the client side module 13 has already been provided to the web enabled device and is available to the web page 12 running in the web client 11 from a local store it may be loaded from this local store. Thus, say, if the client side module 13 is delivered when a first web page is delivered from a monitored website, then the client side module 13 will typically be available in a local store when further pages are delivered from that same website.

At a general level the client side module 13 is arranged for monitoring user interaction with the web enabled device from within the web client i.e. browser 11 and sending this gathered information back to the configuration and collection server 4. Thus, in terms of overall operation at this level, the user of the web enabled device 1 will browse to a particular web page 12 using their browser 11 and this will cause delivery of the web page 12 from the web server 3. Then by virtue of operation of the client side module 13, running within the web page 12, the user interaction with that web page 12 and also with the web enabled device 1 in general whilst using the web page 12, can be monitored by the client side module 13 and this information fed back to the configuration and collection server 4.

This type of user interaction monitoring, making use of a client side page tagging technique such that a web page delivered 12 calls the client side module 13 that collects monitoring information is an existing technique and is, for example, discussed in prior patent specifications of the applicant and its predecessor for example GB2356783B, U.S. Pat. Nos. 8,898,309 and 8,880,710. Note that this type of technique puts control of the monitoring in the hands of the website owner and facilitates customisation of monitoring from website to website. These existing systems however do not address the issue of how to provide enhanced functionality such as fraud prevention/user identity verification whilst mitigating against what could be prohibitive volumes of data collection.

Below, the present system is described in more detail, with reference to FIGS. 2, 3, 4, 5A and 5B.

Figure 2:
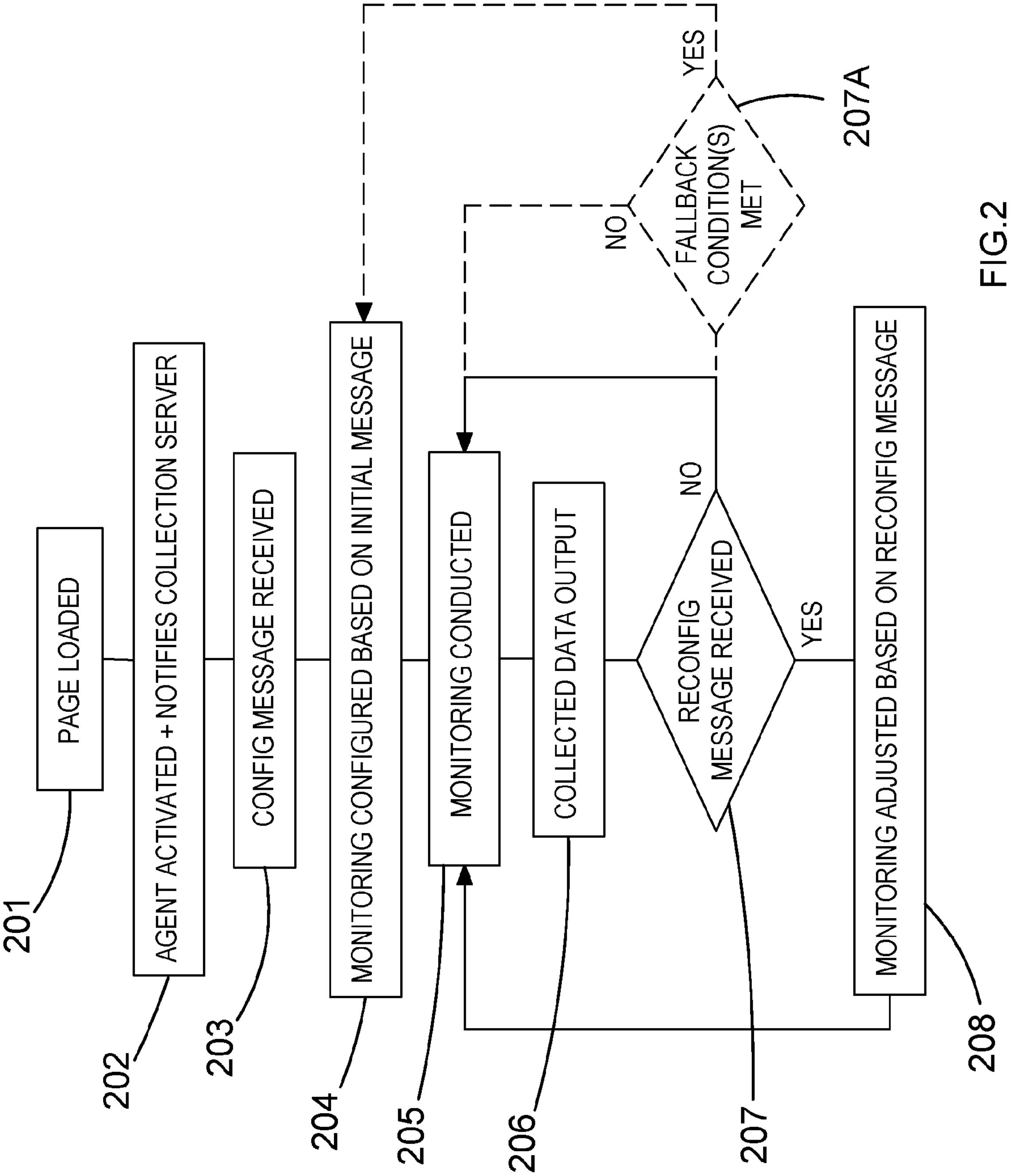
FIG. 2 is a flow chart showing processes which occur at a web enabled device in operation of the user interaction monitoring system of FIG. 1.

FIG. 2 is a flow chart showing processes which occur at the web enabled device 1 and in particular within the web client, that is the browser 11 in the present embodiment. At step 201, a web page 12 is loaded into the browser 11. As mentioned above this page includes a call to the client side module 13 (which may also be referred to as a data collection agent). This client side module 13 may already be present in the browser 11 if it has previously been delivered or it may be called from the configuration and collection server 4.

In step 202 the client side module 13 is activated and notifies the configuration and collection server 4. In a response to this, the collection and configuration server 4 sends back a configuration message which is received in step 203. At this stage, in step 204, the monitoring operation of the client side module 13 is configured based on this initial configuration message.

Then in step 205 monitoring is conducted by the client side module 13 in accordance with its configuration determined by the initial configuration message.

In step 206 data which is collected as a result of this monitoring is output under the control of the client side module 13 from the web enabled device 1 and sent to the configuration and collection server 4.

At this stage, in step 207, we have a circumstance where either a further reconfiguration message is received or there is no such further reconfiguration message.

Where there is no such reconfiguration message in step 207, monitoring continues in step 205 and the newly collected data is output in step 206. Thus, monitoring can continue in this way for as long as the client side module 13 is active. In practice this will typically mean that this monitoring will continue whilst the web page 12 is still loaded in the web client 11.

On the other hand, if a new configuration message is received in step 207 then, in step 208, the monitoring which is to be conducted by the client side module 13 is adjusted based on this new configuration message and the process can return to step 205 where monitoring is conducted in accordance with this new configuration message.

With this above described process it means that an initial configuration may be set by the initial configuration message received at step 203 and, where it is determined appropriate at the server 4 to change what is being monitored, this change in monitoring may be effected by the sending of a second configuration message at step 207. Furthermore, further reconfiguration messages may be sent at later times.

Note also that both the initial configuration message and the second and any further configuration messages are sent to the web enabled device 1 and particular to the client side module 13 whilst one particular web page is loaded in the web client 11. Thus, the first configuration message can set up an initial set of monitoring to be carried out in respect of the user interaction with the web enabled device 1 whilst this web page 12 is loaded. The second and any subsequent configuration message can be sent to change this monitoring whilst the user is still interacting with that same web page 12. That is to say, whilst that same web page is still loaded in the user's web browser 11. This means that when appropriate determinations are made, changes (most likely increases) in the amount of information which is monitored, collected, and sent back to the server 4 can be made during a users interaction with the same loaded web page.

This for example facilitates monitoring a user's interaction with a web page at an initial level and stepping up the monitoring if there is a suspicion that the user may not be an authorised user and/or if a higher risk activity is being initiated.

As an example, the initial configuration message received in step 203 may contain an instruction to monitor a first parameter whereas a further configuration message in step 207 may contain an instruction to monitor a second parameter instead of, or as well as, the first parameter and/or it may contain an instruction to increase the frequency at which the first parameter is monitored and/or the resolution or accuracy with which the first parameter is monitored.

The content and selection of configuration messages will be discussed in more detail below following a description of processes which are carried out at the configuration and collection server 4.

In a modified version of the present embodiment, the client side module is arranged to determine in a step 207A whether fallback conditions are met in a circumstance where no new configuration message is received in step 207. In such a case, rather than the process automatically returning to step 205 so that monitoring is conducted based on the configuration that is active in that time, in perpetuity, a further check is made in step 207A. In step 207A, if it is determined that fallback conditions have been met, then the process returns to step 204 so that monitoring reverts so as to be carried out in accordance with the initial configuration message. Whereas, if fallback conditions have not been met, then the process returns to step 205 and monitoring continues to be conducted using the current configuration settings.

As one example, a fallback condition may be the elapse of a period of time. That is to say if monitoring is being conducted at an enhanced level, for example, based on a second or subsequent configuration message, then rather than carrying on monitoring at this higher level indefinitely, after a certain predetermined period has elapsed, a fallback condition can be treated as met in step 207A such that monitoring may be returned to an initial setting. To give a more concrete example, monitoring may be initiated using the initial settings but increased to an enhanced level of monitoring due a decision made at the server. The client side module 13 may be configured to only carry on at this enhanced level of monitoring for a maximum of x minutes before lapsing back to the initial configuration.

The inclusion of step 207A can, for example, help avoid a circumstance where, inadvertently, a very intense level of monitoring is continued for an unintentionally long period.

Figure 3:
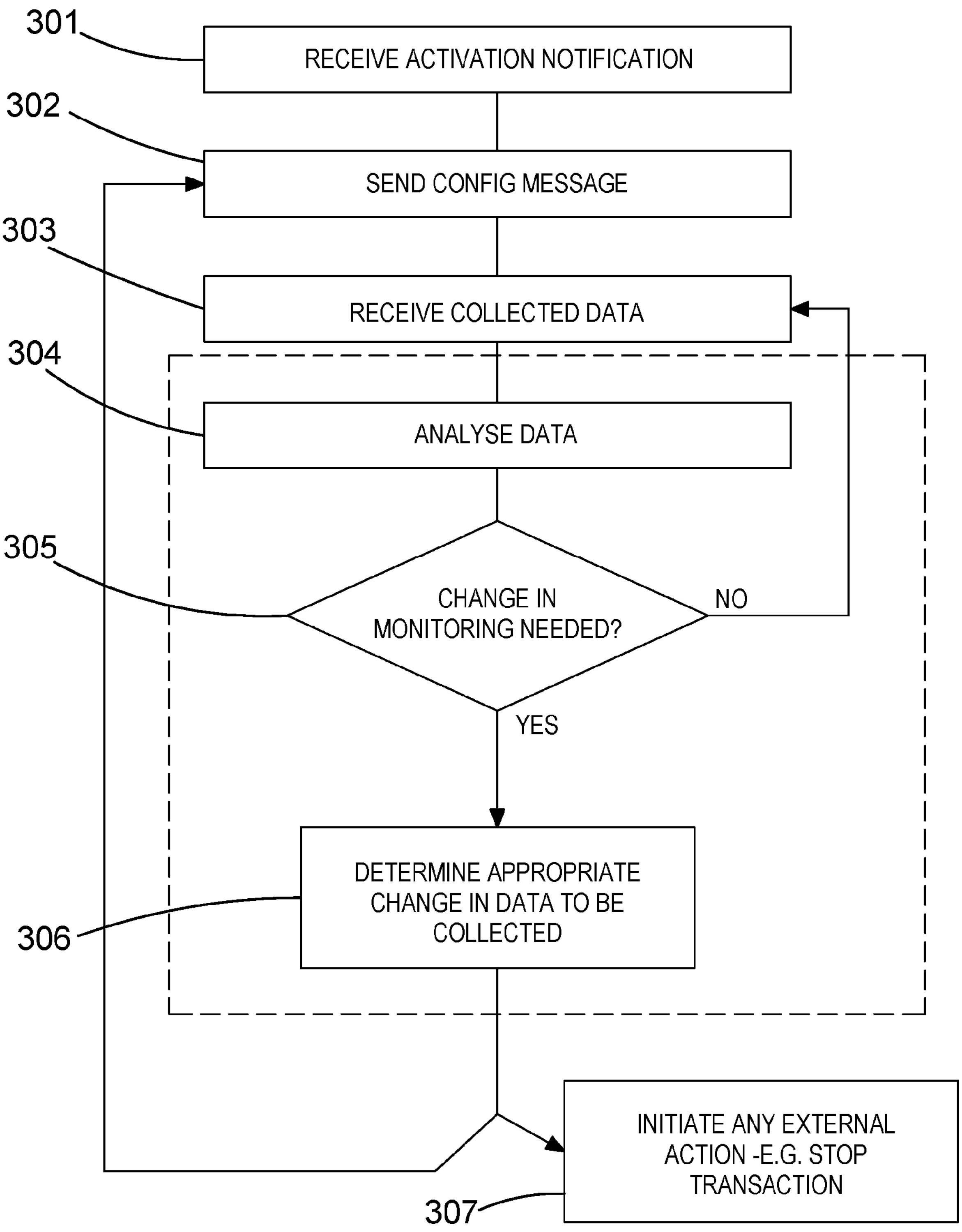
FIG. 3 is a flow chart showing processes which occur at a configuration and collection server in operation of the user interaction monitoring system of FIG. 1.

FIG. 3 schematically shows processes which occur at the configuration and collection server 4 during the monitoring of user interaction with web enabled device 1. In step 301 we are in a situation where the web page 12 has been loaded into the web enabled device 1 and this has resulted in the client side module 13 on that web enabled device 1 issuing an activation notification. Thus, at step 301 the activation notification is received by the configuration and collection server 4. In response to this, in step 302, the configuration and collection server 4 sends a first configuration message to the web enabled device 1. Then at some time later, in step 303, the configuration and collection server 4 receives collected data from the web enabled device 1 and in step 304 it analyses this data.

As a result of this analysis a decision is made in step 305 as to whether a change in monitoring activity at the web enabled device 1 is appropriate. If a decision is made in step 305 that a change in monitoring is not appropriate, then the configuration and collection server 4 will continue to receive data from the web enabled device 1 and the process returns to step 303.

On the other hand, if in step 305 it is decided that a change in monitoring is needed, then in step 306 a determination is made of what the appropriate change in data to be collected should be, and this can cause sending of a further configuration message by virtue of the process returning to step 302.

Further, as part of the process of analysing the data and determining whether a change in data to be collected is appropriate, the configuration and collection server 4 may also generate an alert output which is arranged to initiate an external action. That is to say, to initiate action which is external to the monitoring process which we are currently describing. Thus, an external action may be to take steps to stop a transaction being conducted if, for example, it is detected that a user using the web enabled device at that point in time is not an authorised user. Thus, the configuration and collection server 4 may be arranged to issue a suitable message to another server, say the web server 3 or a different server which can initiate appropriate action. This message might for example, prevent a transaction from being completed or prevent delivery of one or more web pages to the web enabled device. That is to say, for example, to prevent the user navigating from the current web page loaded in the web enabled device to a next web page which would facilitate the transaction which they have attempted to start.

The processes in steps 304, 305 and 306 in FIG. 3 may, in some embodiments, be considered to be carried out by an analysis and decision module. Further details of these three processes and hence the operation of what can be considered an analysis and a decision module is described below in relation to FIG. 4.

FIG. 4 is a flow chart showing in more detail some sub-processes which may happen within the process 305 of FIG. 3 where a determination is made as to whether a change in monitoring is justified.

In a first sub-process 3051, a determination may be made as to whether behaviour of the user as indicated by the collected monitoring information matches an expected pattern of behaviour for the user who is expected to be using the web enabled device 1, that is to say, an authorised user.

In some embodiments a determination may be made in step 3052 as to whether a difference between the detected behaviour and the expected behaviour exceeds a predetermined threshold.

In step 3053 a determination can be made as to whether increased monitoring will assist with the overall aim of the monitoring. As an example here, if the monitoring is being carried out in order to determine whether the user of the web enabled device 13 is in fact the person that they are presenting to be, then it will only be useful to increase monitoring activity in relation to user behaviour for that authorised user if there is access to relevant expected behaviour data for that user.

In some alternatives, the determination of whether a change in monitoring is justified may include in step 3054 a determination of whether the activity being conducted at that time (i.e. the activity being monitored) as has been categorised as a sensitive or high risk activity. As an example, the filling in of a data form and/or an attempt to make a purchase might be categorised as a sensitive or a high risk activity.

The current system makes possible use cases which would otherwise require a prohibitive volume of data collection. By dynamically configuring the client side module (or data collection agent), high volume data collection levels can be limited to just those visitor web sessions which require it. For example, the data collected from a suspicious session might step up to include mouse movements, gestures (zoom, pan and scroll), and key press data (duration, typing speed). This high volume data however would not be collected for every visitor, but only in those instances where it was detected that this seemed appropriate. Furthermore, the client side module may be dynamically altered itself so as to provide it with, or adjust, models or algorithms which can be executed by the client side module that is to say, client side, so as to emit only pre-processed data or the results of analysis of this data. Furthermore, by dynamically altering the client side module itself, types of data can be collected when this becomes possible even in circumstances where such monitoring was not possible or feasible at the point when the client side module or web page calling that client side module was first created.

In general terms there are various use cases which exist where it is beneficial to dynamically configure the data which the client side module may collect as it operates within a web page. Such configuration can be determined not only based on attributes of the web page browser 11 and IP address the visitor is using, but in addition, based on the interactions and behaviours of the web page visitor i.e. the user of the web enabled device 1, during their interaction with the web page 12.

By maintaining a real time server side state of a web session at the configuration and collection server 4 which comprises both historic and current session data, a visitor's (i.e. a user of the web enabled device 1) behaviour and intent can be determined. Rules running within this real time server side component can use this state in combination with environment attributes to determine the level of data collection required. This revised configuration (as encoded in a second or subsequent configuration message) can then be provided to the client side module to dynamically change its data collection level within the page.

As alluded to above, the identification or perhaps more accurately, the verification of the identity of a user is of particular interest and is facilitated by the present systems. Fraud prevention in an online world is of paramount importance. Ensuring users trust the online world and particularly the online relationship they have their banks is a necessity for the modern age.

The use of score cards to determine a visitor's biometric identity is a powerful authentication factor to compliment more traditional mechanisms such as passwords, SMS texts, fingerprints and so on. Such score cards can use a variety of data, some of which is very high volume. Using the present system, the collection of such high volumes of data can be facilitated and limited to visitors and instances which are of interest and at least in some circumstances, at least part of the processing may be pushed to a client, in particular, to the client side module 13. This can lead to options which would be impractical without the present ideas.

As mentioned above, verification of a user's identify is of particular interest and the configuration and collection server 4 may be arranged under the control of software to aid this by following the processes described in relation to FIGS. 3 and 4 above. In such cases the processes of analysing data and determining whether a change in monitoring is justified, and in determining an appropriate change in data to be collected i.e. steps 304, 305 and 306, (and the operation of an analysis and decision module where this is considered to be implemented) are directed at performing the user authentication function and causing reconfiguration of the client side module in order to aid towards this user authentication function.

Thus, for example the configuration and collection server 4 or another computer device to which the configuration and collection server 4 has access may hold a store of biometric information in connection with one or more authenticated user. The configuration and collection server 4 may be arranged for comparing detected user behaviour from the monitoring information with the user information held in the store and from this determining whether a change in configuration so as to gather a different set of data is appropriate and/or so as to determine whether other action should be taken to, for example, stop a transaction as indicated in step 307.

In some circumstances, the system may be constructed fairly simply so that if an initial set of user behaviour causes doubt about whether the user is indeed an authorised user of the service which they are accessing through the web site, then it is determined that monitoring should be enhanced and a pre-set enhanced monitoring configuration message can be sent to the client side module to enhance monitoring at that time.

Thus in this simple system there is a basic monitoring setting, set by an initial configuration message, and an enhanced monitoring set by a second configuration message and this is it, there is no great flexibility in the system just, two different pre-defined levels of monitoring.

This may be satisfactory in some circumstances. As a specific example in such a case, the first configuration message may cause the client side module to monitor an angle at which the web enabled device 1 is being held (say where this is a mobile communications device), and where the angle becomes non-typical, as determined at the configuration and collection server 4, the configuration and collection server 4 can send a second configuration message to the web enabled device 1 to up the monitoring to the enhanced monitoring setting during which, for example, key press data (say duration of key press and typing speed) is monitored to help verify whether the user is in fact the authorised user.

In a more sophisticated system, the configuration and collection server 4 may be arranged to have a broader range of options which may be taken in response to monitoring information. That is to say, different monitored conditions or situations or different degrees of difference between expected behaviour and detected behaviour may cause different contents of a second or subsequent configuration message to be sent to the web enabled device 1. Further, as alluded to above, it is possible to have numerous further configuration messages sent after the first configuration message is sent. Thus there can be a gradual "ramping up" or "testing out" of different monitoring specifications (for example, different parameters or different frequencies, accuracies, or resolutions of measurements of these parameters) in order to yield the intended result.

Thus, in another example, after the two steps of measuring a holding angle and collecting key press data, there could be a further step initiated by a corresponding further configuration message of analysing say, mouse/cursor movements or gestures.

The set of monitoring operations to be conducted in reaction to any given configuration message may be termed a specification. Thus a first configuration message may be arranged to cause monitoring of user interaction according to a first specification including say, device angle. A second configuration message may cause monitoring of user interaction according to a second specification including say, device angle and key press data. A third configuration message may be arranged to cause monitoring of user interaction according to a third specification including say, device angle, key press data and mouse/cursor movement data.

In a particular implementation where a comparison is made between detected user behaviour and expected user behaviour, the configuration and collection server may be arranged to score how far the detected user behaviour is from the expected user behaviour. Then the configuration and collection server may be arranged to determine an appropriate change in monitoring based on this score. Thus, as a specific example if it is determined that a comparison between detected user behaviour and expected user behaviour scores a score of 1, meaning there is a difference but it is not great, then a first escalation in monitoring might be to monitor whether the device is moving. This might indicate that the user might be walking or in a car which could change say the angle at which the device is normally held.

On the other hand if a score of 2 is determined as a result of the comparison between the detected user behaviour and the expected user behaviour indicating that there is a greater difference from that expected, then the monitoring may be escalated further by collecting more detailed information such as key press biometric data or (gesture swipe, zoom, pan) biometric data for example.

In some implementations, the configuration and collection server 4, may hold a table of scores or range of scores and associated with each of these, details of the monitoring which should be configured if such score is achieved. An example of such a table is shown below.

| Score | Monitored Parameters Plus Sampling Specification |
|---|---|
| 0 | Maintain initial configuration |
| 1 | Monitor if device is moving |
| 2 | Monitor key press data with resolution 1 |
| 3 | Monitor key press data with resolution 2 which is higher than level 1 |
| 4 | Monitor key press data with resolution 2 which is higher than level 1 and monitor gesture data |

Ultimately, where the result of this monitoring activity is that a user's identity is verified or at least not challenged, the present system may leave alone further operation of the service being accessed by the user through the web page 12 loaded in the web enabled device 1. Whereas if the identity of the user is called into question, the system can take action to initiate steps to either prevent further operation of the web page 12 at that time by, for example, a direct message back to the client side module 13 to stop further operation of the web page 12 or sending a message to the web server 3 or another appropriate server or generate an external alert to a selected system indicating that the identify of a user is in question or so on.

In alternatives the server device may be arranged for using machine learning techniques in making decisions. Thus for example the server device may be arranged under the control of software to use at least one of a machine learning technique, a neural network, linear regression, and a decision tree in determining at least one of a score found when comparing detected user behaviour with expected user behaviour and content for the second configuration message.

In other alternatives the second or a subsequent configuration message may be arranged to cause the client side module 13 to collect additional information not specified in the earlier configuration message, and to hold this information, or part of this information—this might be termed auxiliary information—rather than send this onto the server. The auxiliary information might be held at the web enabled device 1 unless and until the receipt of a further configuration message which calls for it to be sent to the configuration and collection server 4. This is an alternative form of ramping up of monitoring where at a first stage, or level of, doubt of a user's identity say, a first set of information is collected, then at a next stage or level more information is collected but held locally, and then at a third level this collected information is sent to the server 4.

In another alternative the second or subsequent configuration message may change the sophistication or quality of an algorithm used at the client side module 13 during monitoring.

A specific example of this can be considered with reference to FIGS. 5A and 5B. FIGS. 5A and 5B show traces 501A and 501B which are illustrative of the output of two different algorithms which may be used for tracking cursor position. The trace 501A in FIG. 5A illustrates the use of a more sophisticated algorithm which calculates a series of non linear arcs which best fit to the observed movement of the cursor at the web enabled device 1. The trace 501B in FIG. 5B illustrates the use of a less sophisticated algorithm which calculates a series straight line segments which best fit to the observed movement of the cursor at the web enabled device 1.

Both of these track and report on the observed movement but the more sophisticated algorithm is a more accurate representation which uses more processing power at the web enabled device 1. Similarly in some instances different algorithms might use different resources at the web enabled device 1—say an internal gyroscope, or GPS sensors—these might use more battery at the web enabled device 1 and/or more processing power.

Thus in the same way as above the configuration messages may call for the use of different algorithms and/or the use of different hardware in different circumstances. So, for example, at low risk times—in terms of the activities being conducted at the web enabled device 1, and/or the confidence level of the identity of the user—less "expensive" algorithms may be used than at higher risk times.

Note that whilst in this specification we are concentrating on certain aspects of the content of the configuration messages that are relevant to the present ideas such as user authentication, the initial configuration message and/or any subsequent configuration messages may also contain more general details of user interaction monitoring that should be carried out by the client side module 13. In at least some cases the primary function of the monitoring, may be to monitor the functioning and operation of the loaded web page (and other web pages on the website) from the users point of view in general terms—to give a picture, say, of the user journey through the web page and website. Thus one or more of the configuration messages may cause a whole range of monitoring at the web client, with aspects of monitoring which are reconfigured being only one part of what is monitored. In some cases this more general monitoring might be ceased temporarily whilst enhanced user authentication monitoring is taking place—again this is controllable through the configuration messages.

In some instances the present ideas may be used in relation to services which are provided over a network to a client device using an architecture that does not involve the delivery of web pages. In such a case a software application at the client—say an "APP" installed on a mobile device—can be the software via which a user interacts and via which monitoring is of interest. In such cases many of the present ideas are still applicable, and operation, particularly from the point of view of the server may be much the same. Again configuration messages may be sent to the client device to control its monitoring operation and again the content of the configuration messages may be determined based on an analysis of the information obtained during monitoring. Again the type of services which the user accesses may well be the same—say accessing a bank account or other on-line account where user authentication is important. Thus most of the above described ideas may also be implemented in such a system/environment, a complete description of such a system is not given here merely in the interest of avoiding unnecessary repetition.

Below are further statements of invention in numbered paragraphs

Paragraph 1. A user interaction monitoring server device arranged for monitoring user interaction with a web enabled device where there is a client side module running within a web client on the user web enabled device for carrying out a monitoring operation to monitor user interaction with at least one of the web enabled device and a webpage loaded in the web client on the web enabled device, the user interaction monitoring server device being arranged under the control of software to:

- receive data from the client side module running within the web client on the user web enabled device;
- send from the server to the client side module running within the web client on the user web enabled device a first configuration message, which message is arranged to configure the monitoring operation of the client side module so as to cause monitoring of user interaction according to a first specification;
- receive at the server from the client side module running within the web client on the user web enabled device information obtained by the monitoring operation of the client side module in accordance with the first specification;
- analyse the information received from the client side module;

determine whether the information received from the client side module meets predetermined criteria such that a change in configuration of the client side module is justified; and where it is determined that a change in configuration of the client side module is justified, send from the server to the client side module running within the web client on the user web enabled device, a second configuration message, which message is arranged to configure the monitoring operation of the client side module so as to cause monitoring of user interaction according to a second specification.

Paragraph 2. A user interaction monitoring server device according to paragraph 1 in which the user interaction monitoring server device is arranged under the control of software to determine an appropriate change in data to be collected at the client side module and hence determine a content of the second configuration message once a determination has been made that a change in configuration of the client side module is justified and before sending the second configuration message to the client.

Paragraph 3. A user interaction monitoring server device according to paragraph 1 or paragraph 2 in which the user interaction monitoring server device is arranged to send an alert message in response to an alert condition being determined at user interaction monitoring server device.

Paragraph 4. A user interaction monitoring server device according to any one of paragraphs 1 to 3 in which the user interaction monitoring server device is arranged under the control of software, as part of determining whether a change in configuration of the client side module is justified, to compare user behaviour as identified from the information received from the client side module with expected user behaviour held in a store in respect of an authorised user of the web page loaded in the web client.

Paragraph 5. A user interaction monitoring server device according to paragraph 4 in which the user interaction monitoring server device is arranged under the control of software to determine that a change in configuration of the client side module is at least potentially justified when a difference between the user behaviour as identified from the information received from the client side module and the expected user behaviour exceeds a threshold.

Paragraph 6. A user interaction monitoring server device according to paragraph 5 in which the user interaction monitoring server device is arranged under the control of software to determine whether other predetermined conditions are met before a change in configuration is initiated.

Paragraph 7. A user interaction monitoring server device according to any one of paragraphs 1 to 4 in which the user interaction monitoring server device is arranged under the control of software to:

i) determine that a change in configuration of the client side module is at least potentially justified when a difference between the user behaviour as identified from the information received from the client side module and the expected user behaviour exceeds a threshold;

ii) determine whether other predetermined conditions are met; and where i) and ii) are determined, to send from the server to the client side module running within the web client on the user web enabled device, a second configuration message, which message is arranged to configure the monitoring operation of the client side module so as to cause monitoring of user interaction according to a second specification.

Paragraph 8. A user interaction monitoring server device according to any one of paragraphs 1 to 7 in which the user interaction monitoring server device is arranged under the control of software, as part of determining whether a change in configuration of the client side module is justified, to determine whether the activity being conducted via the web page loaded in the web client falls within a predefined category of activities.

Paragraph 9. A user interaction monitoring server device according to any one of paragraphs 1 to 8 in which the user interaction monitoring server device is arranged under the control of software, as part of determining whether a change in configuration of the client side module is justified, to compare user behaviour as identified from the information received from the client side module with expected user behaviour held in a store in respect of an authorised user of the web page loaded in the web client; and to determine a score which is indicative of how closely the user behaviour as identified from the information received from the client side module matches with expected user behaviour.

Paragraph 10. A user interaction monitoring server device according to paragraph 9 in which the user interaction monitoring server device is arranged under the control of software, as part of determining an appropriate change in data to be collected at the client side module and hence determining a content of the second configuration message, to determine a content of the second configuration message based on said score.

Paragraph 11. A user interaction monitoring server device according to paragraph 10 in which the user interaction monitoring server device is arranged under the control of software to select the content of the second configuration message so as to give a lower level of monitoring when a first score is determined than when a second score is determined where the second score is indicative of the detected behaviour being further from the expected behaviour than the first score.

Paragraph 12. A user interaction monitoring server device according to paragraph 10 or paragraph 11 in which the user interaction monitoring server device is arranged under the control of software to:

store a table of entries, each entry comprising one of a score and a score range and at least one monitoring characteristic associated with said one of a score and a score range;

wherein each monitoring characteristic comprises at least one of a parameter and a parameter and sampling specification pair; and the user interaction monitoring server device is arranged under the control of software to select the content of the second configuration message based on the at least one monitoring characteristic which is associated in the table with said one of a score and a score range which matches the determined score indicating how closely the user behaviour as identified from the information received from the client side module matches with expected user behaviour.

Paragraph 13. A method of monitoring user interaction with a web enabled device where there is a client side module running within a web client on the user web enabled device for carrying out a monitoring operation to monitor user interaction with at least one of the web enabled device and a webpage loaded in the web client on the web enabled device, the method comprising using a user interaction monitoring server device to carry out the steps of:

receiving data from the client side module running within the web client on the user web enabled device;

sending from the server to the client side module running within the web client on the user web enabled device a first configuration message, which message is arranged to configure the monitoring operation of the client side module so as to cause monitoring of user interaction according to a first specification;

receiving at the server from the client side module running within the web client on the user web enabled device information obtained by the monitoring operation of the client side module in accordance with the first specification;

analysing the information received from the client side module;

determining whether the information received from the client side module meets predetermined criteria such that a change in configuration of the client side module is justified; and where it is determined that a change in configuration of the client side module is justified, sending from the server to the client side module running within the web client on the user web enabled device, a second configuration message, which message is arranged to configure the monitoring operation of the client side module so as to cause monitoring of user interaction according to a second specification.

[End of Description]

The invention claimed is:

1. A web enabled device arranged for monitoring user interaction with the web enabled device, the web enabled device comprising at least one processor and being configured to perform operations comprising:

running a web client for loading and displaying webpages to a user;

running a client side module within the web client;

sending, using the client side module, data to a server; and carrying out a monitoring operation, using the client side module, to monitor user interaction with at least one of the web enabled device and, via the web enabled device, a webpage loaded in the web client on the web enabled device, wherein the web enabled device is further configured to:

receive from the server a first configuration message, the first configuration message being arranged to configure the monitoring operation of the client side module so as to cause monitoring of user interaction according to a first specification;

configure the client side module using the first configuration message and send to the server, using the client side module, information obtained by the monitoring operation of the client side module in accordance with the first specification;

receive from the server a second configuration message, the second configuration message being arranged to configure the monitoring operation of the client side module so as to cause monitoring of user interaction according to a second specification; and configure the client side module using the second configuration message and send to the server, using the client side module, information obtained by the monitoring operation of the client side module in accordance with the second specification, wherein the client side module runs within the webpage loaded in the web client and the client side module is arranged for receiving both the first configuration message and the second configuration message whilst running in the webpage loaded in the web client and the client side module is arranged for carrying out the monitoring operation according to the first specification and carrying out the monitoring operation according to the second specification whilst running in said webpage.

2. The web enabled device according to claim 1 in which the monitoring of user interaction according to at least one of the first specification and the second specification comprises monitoring user interaction with a web page loaded in the web client.

3. The web enabled device according to claim 1 in which the monitoring of user interaction according to at least one of the first specification and the second specification comprises monitoring user interaction with the web enabled device which is distinct from interaction with a web page loaded in the web client and yet is detectable from within the web client by the client side module.

4. The web enabled device according to claim 1 in which the first configuration message is arranged to configure the client side module to monitor a first parameter and the second configuration message is arranged to configure the client side module to monitor at least one of:

a second parameter which is different from the first parameter in place of monitoring the first parameter; and the first parameter and at least one further parameter.

5. The web enabled device according to claim 1 in which at least some of the monitoring of user interaction with the web enabled device is chosen in order to check or collect Biometric data associated with the user.

6. The web enabled device according to claim 1 in which at least one of:

the monitoring operation according to the first specification comprises, at the client side module, processing data obtained by monitoring user interaction with at least one of the web enabled device and a webpage loaded in the web client on the web enabled device to generate said information obtained by the monitoring operation according to the first specification; and the monitoring operation according to the second specification comprises, at the client side module, processing data obtained by monitoring user interaction with at least one of the web enabled device and a webpage loaded in the web client on the web enabled device to generate said information obtained by the monitoring operation according to the second specification.

7. The web enabled device according to claim 1 in which the client side module is arranged for receiving both the first configuration message and the second configuration message whilst said webpage is loaded in the web client and the client side module is arranged for carrying out the monitoring operation according to the first specification and carrying out the monitoring operation according to the second specification whilst said webpage is loaded in the web client.

8. The web enabled device according to claim 1 in which the first configuration message comprises an initial configuration for the client side module and the client side module is arranged under software to fall back to said initial configuration after having been configured in accordance with the second configuration message where fall back conditions are met.

9. A user interaction monitoring system for monitoring user interaction with a web enabled device, comprising the web enabled device comprising at least one processor as claimed in claim 1 and a user interaction monitoring server device comprising at least one processor configured for monitoring user interaction with the web enabled device on which the user interaction monitoring server device is running a software application arranged to carry out a monitoring operation to monitor user interaction with at least one of the web enabled device and a service accessed via the web enabled device, the user interaction monitoring server device being in communication with the web enabled device over a network in use and being arranged to:

receive data from the software application running on the web enabled device;

send from the user interaction monitoring server device to the web enabled device a first configuration message, the first configuration message being arranged to configure the monitoring operation of the software application so as to cause monitoring of user interaction according to a first specification;

receive at the user interaction monitoring server device from the software application running on the web enabled device information obtained by the monitoring operation of the software application in accordance with the first specification;

analyse the information received from the software application;

determine whether the information received from the software application meets predetermined criteria such that a change in configuration of the software application is justified; and where determined that a change in configuration of the software application is justified, send from the user interaction monitoring server device to the software application running on the web enabled device, a second configuration message, the second configuration message being arranged to configure the monitoring operation of the software application so as to cause monitoring of user interaction according to a second specification, where in use there is a client side module running within a web client on the web enabled device and the client side module is arranged to carry out said monitoring operation at the web enabled device and the user interaction monitoring server device is arranged to receive said data from the client side module, send said first configuration message to the client side module, receive said information obtained by the monitoring operation from the client side module and send said second configuration message to the client side module.

10. A non-transitory machine-readable storage medium storing a computer program comprising code portions which when loaded and run on a computer device cause the computer device to constitute a web enabled device as claimed in claim 1.

11. The web enabled device according to claim 1 in which the first configuration message is arranged to configure the client side module to monitor a first parameter with a first sampling specification and the second configuration message is arranged to configure the client side module to monitor the first parameter but with a second sampling specification, wherein the second sampling specification differs from the first sampling specification.

12. A user interaction monitoring server device arranged for monitoring user interaction with a client device on which is running a software application arranged to carry out a monitoring operation to monitor user interaction with at least one of the client device and a service accessed via the client device, the user interaction monitoring server device being in communication with the client device over a network in use and comprising at least one processor and being configured to perform operations comprising:

receiving data from the software application running on the client device;

sending from the user interaction monitoring server device to the client device a first configuration message, the first configuration message being arranged to configure the monitoring operation of the software application so as to cause monitoring of user interaction according to a first specification;

receiving at the user interaction monitoring server device from the software application running on the client device information obtained by the monitoring operation of the software application in accordance with the first specification;

analysing the information received from the software application;

determining whether the information received from the software application meets predetermined criteria such that a change in configuration of the software application is justified; and where determined that a change in configuration of the software application is justified, sending from the user interaction monitoring server device to the software application running on the client device, a second configuration message, the second configuration message being arranged to configure the monitoring operation of the software application so as to cause monitoring of user interaction according to a second specification, wherein the user interaction monitoring server device is configured to determine initially whether a change in configuration of the software application is justified and if a change in configuration of the software application is determined to be justified, determine an appropriate change in data to be collected at the software application and hence determine a content of the second configuration message before sending the second configuration message to the client device.

13. The user interaction monitoring server device according to claim 12 in which the user interaction monitoring server device is arranged to send an alert message in response to an alert condition being determined at the user interaction monitoring server device.

14. The user interaction monitoring server device according to claim 12 in which the user interaction monitoring server device is arranged, as part of determining whether a change in configuration of the software application is justified, to compare user behaviour as identified from the information received from the software application with expected user behaviour held in a store in respect of an authorised user of a service being accessed at the client device.

15. The user interaction monitoring server device according to claim 14 in which the user interaction monitoring server device is arranged to determine that a change in configuration of the software application is at least potentially justified when a difference between the user behaviour as identified from the information received from the software application and the expected user behaviour exceeds a threshold.

16. The user interaction monitoring server device according to claim 15 in which the user interaction monitoring server device is arranged to determine whether other predetermined conditions are met before a change in configuration is initiated.

17. The user interaction monitoring server device according to claim 12 in which the user interaction monitoring server device is arranged to:

i) determine that a change in configuration of the software application is at least potentially justified when a difference between user behaviour as identified from the information received from the software application and expected user behaviour exceeds a threshold;

ii) determine whether other predetermined conditions are met; and where i) and ii) are determined, to send from the user interaction monitoring server device to the software application running on the client device, a second configuration message, the second configuration message being arranged to configure the monitoring operation of the software application so as to cause monitoring of user interaction according to a second specification.

18. The user interaction monitoring server device according to claim 12 in which the user interaction monitoring server device is arranged, as part of determining whether a change in configuration of the software application is justified, to determine whether activity being conducted via a service being accessed at client device falls within a predefined category of activities.

19. The user interaction monitoring server device according to claim 12 in which the user interaction monitoring server device is arranged, as part of determining whether a change in configuration of the software application is justified, to compare user behaviour as identified from the information received from the software application with expected user behaviour held in a store in respect of an authorised user of a service being accessed at the client device; and to determine a score which is indicative of how closely the user behaviour as identified from the information received from the client side module matches with the expected user behaviour.

20. The user interaction monitoring server device according to claim 19 in which the user interaction monitoring server device is arranged, as part of determining an appropriate change in data to be collected at the software application and hence determining a content of the second configuration message, to determine a content of the second configuration message based on said score.

21. The user interaction monitoring server device according to claim 20 in which the user interaction monitoring server device is arranged to select the content of the second configuration message so as to give a first level of monitoring when a first score is determined and so as to give a second level of monitoring when a second score is determined where the first level of monitoring is lower than the second level of monitoring and the second score is indicative of the user behaviour as identified from the information received from the software application being further from the expected user behaviour than indicated by the first score.

22. The user interaction monitoring server device according to claim 20 in which the user interaction monitoring server device is arranged to:

store a table of entries, each entry comprising one of a score and a score range and at least one monitoring characteristic associated with said one of a score and a score range;

wherein each monitoring characteristic comprises at least one of a parameter and a parameter and sampling specification pair; and the user interaction monitoring server device is arranged to select the content of the second configuration message based on the at least one monitoring characteristic which is associated in the table with said one of a score and a score range which matches the determined score indicating how closely the user behaviour as identified from the information received from the software application matches with the expected user behaviour.

23. The user interaction monitoring server device according to claim 19, wherein the processor of the user interaction monitoring server device is arranged to use at least one of a machine learning technique, a neural network, linear regression, and a decision tree in determining at least one of said score and a content of the second configuration message.

24. A user interaction monitoring system for monitoring user interaction with a client device, comprising:

the client device comprising at least one processor configured to run a software application which is arranged to carry out a monitoring operation to monitor user interaction with at least one of the client device and a service accessed via the client device; and a user interaction monitoring server device as claimed in claim 12.

25. The user interaction monitoring server device according to claim 12 in which the client device is a web enabled device comprising at least one processor where in use there is a client side module running within a web client on the web enabled device and the client side module is arranged to carry out said monitoring operation at the client device and the user interaction monitoring server device is arranged to receive data from the client side module, send said first configuration message to the client side module, receive said information obtained by the monitoring operation from the client side module and send said second configuration message to the client side module.

26. A non-transitory machine-readable storage medium storing a computer program comprising code portions which when loaded and run on a computer device cause the computer device to constitute a user interaction monitoring server device as claimed in claim 12.

27. A method of monitoring user interaction with a web enabled device, comprising the steps of:

running a web client for loading and displaying webpages to a user on the web enabled device;

running a client side module within the web client;

sending, using the client side module, data to a server; and carrying out a monitoring operation, using the client side module, to monitor user interaction with at least one of the web enabled device and, via the web enabled device, a webpage loaded in the web client on the web enabled device, wherein the method comprises the further steps of:

receiving from the server a first configuration message, which first configuration message being arranged to configure the monitoring operation of the client side module so as to cause monitoring of user interaction according to a first specification;

configuring the client side module using the first configuration message and sending to the server, using the client side module, information obtained by the monitoring operation of the client side module in accordance with the first specification;

receiving from the server a second configuration message, the second configuration message being arranged to configure the monitoring operation of the client side module so as to cause monitoring of user interaction according to a second specification; and configuring the client side module using the second configuration message and sending to the server, using the client side module, information obtained by the monitoring operation of the client side module in accordance with the second specification wherein the client side module runs within the webpage loaded in the web client and the client side module is arranged for receiving both the first configuration message and the second configuration message whilst running in the webpage loaded in the web client and the client side module is arranged for carrying out the monitoring operation according to the first specification and carrying out the monitoring operation according to the second specification whilst running in said webpage.

28. A method of monitoring user interaction with a web enabled device where there is a software application running on a client device for carrying out a monitoring operation to monitor user interaction with at least one of the client device and a service accessed via the client device, the method comprising using a user interaction monitoring server device to carry out the steps of:

receiving data from the software application running on the client device;

sending from the user interaction monitoring server device to the software application running on the client device a first configuration message, the first configuration message being arranged to configure the monitoring operation of the software application so as to cause monitoring of user interaction according to a first specification;

receiving at the user interaction monitoring server device from the software application running on the client device information obtained by the monitoring operation of the software application in accordance with the first specification;

analysing the information received from the software application;

determining whether the information received from the software application meets predetermined criteria such that a change in configuration of the software application is justified; and where determined that a change in configuration of the software application is justified, sending from the user interaction monitoring server device to the software application running on the client device, a second configuration message, the second configuration message being arranged to configure the monitoring operation of the software application so as to cause monitoring of user interaction according to a second specification, wherein the method further comprises determining initially whether a change in configuration of the software application is justified and if a change in configuration of the software application is determined to be justified, determining an appropriate change in data to be collected at the software application and hence determining a content of the second configuration message before sending the second configuration message to the client device.

29. A web enabled device arranged for monitoring user interaction with the web enabled device, the web enabled device comprising at least one processor and being configured to perform operations comprising:

running a web client for loading and displaying webpages to a user;

running a client side module within the web client;

sending, using the client side module, data to a server; and carrying out a monitoring operation, using the client side module, to monitor user interaction with at least one of the web enabled device and, via the web enabled device, a webpage loaded in the web client on the web enabled device, wherein the web enabled device is further configured to:

receive from the server a first configuration message, the first configuration message being arranged to configure the monitoring operation of the client side module so as to cause monitoring of user interaction according to a first specification;

configure the client side module using the first configuration message and send to the server, using the client side module, information obtained by the monitoring operation of the client side module in accordance with the first specification;

receive from the server a second configuration message, the second configuration message being arranged to configure the monitoring operation of the client side module so as to cause monitoring of user interaction according to a second specification; and configure the client side module using the second configuration message and send to the server, using the client side module, information obtained by the monitoring operation of the client side module in accordance with the second specification, wherein the first configuration message is arranged to configure the client side module to monitor a first parameter with a first sampling specification and the second configuration message is arranged to configure the client side module to monitor the first parameter but with a second sampling specification which second sampling specification differs from the first sampling specification.

30. A user interaction monitoring server device arranged for monitoring user interaction with a client device on which is running a software application arranged to carry out a monitoring operation to monitor user interaction with at least one of the client device and a service accessed via the client device, the user interaction monitoring server device being in communication with the client device over a network in use and comprising at least one processor and being configured to:

receive data from the software application running on the client device;

send from the user interaction monitoring server device to the client device a first configuration message, the first configuration message being arranged to configure the monitoring operation of the software application so as to cause monitoring of user interaction according to a first specification;

receive at the user interaction monitoring server device from the software application running on the client device information obtained by the monitoring operation of the software application in accordance with the first specification;

analyse the information received from the software application;

determine whether the information received from the software application meets predetermined criteria such that a change in configuration of the software application is justified; and where determined that a change in configuration of the software application is justified, send from the user interaction monitoring server device to the software application running on the client device, a second configuration message, the second configuration message being arranged to configure the monitoring operation of the software application so as to cause monitoring of user interaction according to a second specification, wherein the user interaction monitoring server device is arranged to:

i) determine that a change in configuration of the software application is at least potentially justified when a difference between user behaviour as identified from the information received from the software application and expected user behaviour exceeds a threshold;

ii) determine whether other predetermined conditions are met; and where i) and ii) are determined, to send from the user interaction monitoring server device to the software application running on the client device, the second configuration message, the second configuration message being arranged to configure the monitoring operation of the software application so as to cause monitoring of user interaction according to a second specification.

31. A user interaction monitoring server device arranged for monitoring user interaction with a client device on which is running a software application arranged to carry out a monitoring operation to monitor user interaction with at least one of the client device and a service accessed via the client device, the user interaction monitoring server device being in communication with the client device over a network in use and comprising at least one processor and being configured to:

receive data from the software application running on the client device;

send from the user interaction monitoring server device to the client device a first configuration message, the first configuration message being arranged to configure the monitoring operation of the software application so as to cause monitoring of user interaction according to a first specification;

receive at the user interaction monitoring server device from the software application running on the client device information obtained by the monitoring operation of the software application in accordance with the first specification;

analyse the information received from the software application;

determine whether the information received from the software application meets predetermined criteria such that a change in configuration of the software application is justified; and where determined that a change in configuration of the software application is justified, send from the user interaction monitoring server device to the software application running on the client device, a second configuration message, the second configuration message being arranged to configure the monitoring operation of the software application so as to cause monitoring of user interaction according to a second specification, wherein the user interaction monitoring server device is arranged, as part of determining whether a change in configuration of the software application is justified, to compare user behaviour as identified from the information received from the software application with expected user behaviour held in a store in respect of an authorised user of a service being accessed at the client device; and to determine a score which is indicative of how closely the user behaviour as identified from the information received from the client side module matches with the expected user behaviour, wherein the user interaction monitoring server device is arranged, as part of determining an appropriate change in data to be collected at the software application and hence determining a content of the second configuration message, to determine a content of the second configuration message based on said score, and wherein the user interaction monitoring server device is arranged to select the content of the second configuration message so as to give a first level of monitoring when a first score is determined and so as to give a second level of monitoring when a second score is determined where the first level of monitoring is lower than the second level of monitoring and the second score is indicative of the user behaviour as identified from the information received from the client side module being further from the expected user behaviour than the first score.

32. A user interaction monitoring server device arranged for monitoring user interaction with a client device on which is running a software application arranged to carry out a monitoring operation to monitor user interaction with at least one of the client device and a service accessed via the client device, the user interaction monitoring server device being in communication with the client device over a network in use and comprising at least one processor and being configured to:

receive data from the software application running on the client device;

send from the user interaction monitoring server device to the client device a first configuration message, the first configuration message being arranged to configure the monitoring operation of the software application so as to cause monitoring of user interaction according to a first specification;

receive at the user interaction monitoring server device from the software application running on the client device information obtained by the monitoring operation of the software application in accordance with the first specification;

analyse the information received from the software application;

determine whether the information received from the software application meets predetermined criteria such that a change in configuration of the software application is justified; and where determined that a change in configuration of the software application is justified, send from the user interaction monitoring server device to the software application running on the client device, a second configuration message, the second configuration message being arranged to configure the monitoring operation of the software application so as to cause monitoring of user interaction according to a second specification, wherein the user interaction monitoring server device is arranged, as part of determining whether a change in configuration of the software application is justified, to compare user behaviour as identified from the information received from the software application with expected user behaviour held in a store in respect of an authorised user of a service being accessed at client device; and to determine a score which is indicative of how closely the user behaviour as identified from the information received from the client side module matches with expected user behaviour, wherein the user interaction monitoring server device is arranged, as part of determining an appropriate change in data to be collected at the software application and hence determining a content of the second configuration message, to determine a content of the second configuration message based on said score, and the user interaction monitoring server device is arranged to:

store a table of entries, each entry comprising one of a score and a score range and at least one monitoring characteristic associated with said one of a score and a score range;

wherein each monitoring characteristic comprises at least one of a parameter and a parameter and sampling specification pair; and the user interaction monitoring server device is arranged to select the content of the second configuration message based on the at least one monitoring characteristic which is associated in the table with said one of a score and a score range which matches the determined score indicating how closely the user behaviour as identified from the information received from the software application matches with expected user behaviour.

* * * * *